US012592436B2

(12) United States Patent
Yamashita et al.

(10) Patent No.: US 12,592,436 B2
(45) Date of Patent: Mar. 31, 2026

(54) BATTERY PACKAGING MATERIAL, MANUFACTURING METHOD THEREFOR, BATTERY, AND ALUMINUM ALLOY FOIL

(71) Applicant: DAI NIPPON PRINTING CO., LTD., Tokyo (JP)

(72) Inventors: Rikiya Yamashita, Tokyo (JP); Makoto Amano, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 289 days.

(21) Appl. No.: 16/650,462

(22) PCT Filed: Sep. 28, 2018

(86) PCT No.: PCT/JP2018/036586
§ 371 (c)(1),
(2) Date: Mar. 25, 2020

(87) PCT Pub. No.: WO2019/066072
PCT Pub. Date: Apr. 4, 2019

(65) Prior Publication Data

US 2020/0243810 A1 Jul. 30, 2020

(30) Foreign Application Priority Data

Sep. 28, 2017 (JP) ................................ 2017-189173
Jul. 26, 2018 (JP) ................................ 2018-139980

(51) Int. Cl.
*H01M 50/126* (2021.01)
*H01M 50/116* (2021.01)
*H01M 50/119* (2021.01)
*H01M 50/121* (2021.01)
(Continued)

(52) U.S. Cl.
CPC ....... *H01M 50/124* (2021.01); *H01M 50/119* (2021.01); *H01M 50/121* (2021.01); *H01M 50/126* (2021.01); *H01M 50/131* (2021.01)

(58) Field of Classification Search
None
See application file for complete search history.

(56) References Cited

U.S. PATENT DOCUMENTS

2002/0150712 A1 10/2002 Ohtaki et al.
2002/0160212 A1* 10/2002 Yamashita .............. B32B 27/34 428/458
2008/0286635 A1 11/2008 Seino et al.
(Continued)

FOREIGN PATENT DOCUMENTS

CN 102625818 A 8/2012
EP 2 955 770 A1 12/2015
(Continued)

OTHER PUBLICATIONS

English translation of WO-2012036181 (Year: 2012).*
(Continued)

*Primary Examiner* — Yoshitoshi Takeuchi
(74) *Attorney, Agent, or Firm* — Oliff PLC

(57) ABSTRACT

A battery packaging material includes a laminate with at least a base layer, an aluminum alloy foil layer, and a heat-fusible resin layer in this order, and in which the aluminum alloy foil layer satisfies the chemical composition in JIS A8021 and has a Si content of no higher than 0.08 mass %.

7 Claims, 5 Drawing Sheets

(51) Int. Cl.
*H01M 50/124* (2021.01)
*H01M 50/131* (2021.01)

(56) References Cited

U.S. PATENT DOCUMENTS

| | | | | |
|---|---|---|---|---|
| 2012/0190790 | A1 | 7/2012 | Yamaguchi et al. | |
| 2012/0258353 | A1 | 10/2012 | Yamashita et al. | |
| 2013/0029140 | A1 | 1/2013 | Takao et al. | |
| 2013/0209868 | A1 | 8/2013 | Suzuta et al. | |
| 2014/0242333 | A1 | 8/2014 | Dono et al. | |
| 2014/0356655 | A1 | 12/2014 | Yoshino | |
| 2015/0203941 | A1* | 7/2015 | Seki | C22C 21/00 148/692 |
| 2015/0255761 | A1 | 9/2015 | Hashimoto et al. | |
| 2015/0372263 | A1 | 12/2015 | Douke et al. | |
| 2015/0380692 | A1 | 12/2015 | Ojiri et al. | |
| 2016/0172638 | A1 | 6/2016 | Amano et al. | |
| 2016/0197318 | A1* | 7/2016 | Yamashita | H01M 50/193 429/185 |
| 2016/0301040 | A1 | 10/2016 | Takahagi et al. | |
| 2018/0090724 | A1 | 3/2018 | Miyazaki et al. | |
| 2018/0312943 | A1 | 11/2018 | Amano et al. | |

FOREIGN PATENT DOCUMENTS

| | | | | |
|---|---|---|---|---|
| EP | 3 043 399 | A1 | 7/2016 | |
| EP | 3 121 863 | A1 | 1/2017 | |
| JP | H03-120332 | A | 5/1991 | |
| JP | 2000-223087 | A | 8/2000 | |
| JP | 2005-056729 | A | 3/2005 | |
| JP | 2006-312266 | A | 11/2006 | |
| JP | 2006-312768 | A | 11/2006 | |
| JP | 2007-297427 | A | 11/2007 | |
| JP | 2008-287971 | A | 11/2008 | |
| JP | 2010-244930 | A | 10/2010 | |
| JP | 2013-174010 | A | 9/2013 | |
| JP | 2013-222545 | A | 10/2013 | |
| JP | 2014-65956 | A | 4/2014 | |
| JP | 2014-157727 | A | 8/2014 | |
| JP | 2014-175121 | A | 9/2014 | |
| JP | 2015-008119 | A | 1/2015 | |
| JP | 5725224 | B1 | 5/2015 | |
| JP | 2015-106528 | A | 6/2015 | |
| JP | 2015-203154 | A | 11/2015 | |
| JP | 2016-156059 | A | 9/2016 | |
| JP | 2016-184591 | A | 10/2016 | |
| JP | 2016-186934 | A | 10/2016 | |
| JP | 2017-033743 | A | 2/2017 | |
| JP | 2017-069203 | A | 4/2017 | |
| JP | 2017-084787 | A | 5/2017 | |
| JP | 2017-188227 | A | 10/2017 | |
| KR | 10-2013-0062901 | A | 6/2013 | |
| WO | WO-2012036181 | A1 * | 3/2012 | B32B 15/08 |
| WO | 2014-021170 | A1 | 2/2014 | |
| WO | 2014/050542 | A1 | 4/2014 | |
| WO | 2016/159190 | A1 | 10/2016 | |
| WO | 2017/131155 | A1 | 8/2017 | |

OTHER PUBLICATIONS

Jan. 8, 2019 Search Report issued in International Patent Application No. PCT/JP2018/036586.
Bing Lu and T. C. Chung, "New Maleic Anhydride Modified PP Copolymers with Block Structure: Synthesis and Application in PP/Polyamide Reactive Blends", Department of Materials Science and Engineering, The Pennsylvania State University; Macromolecules vol. 32, No. 8, 1999, pp. 2525-2533 (Year: 1999).
Feb. 23, 2022 Office Action issued in U.S. Appl. No. 16/604,895.
Jul. 24, 2018 International Search Report issued in International Patent Application No. PCT/JP2018/016359.
Dec. 22, 2020 Extended European Search Report issued in European Patent Application No. 18787250.2.
Feb. 4, 2021 Office Action issued in Korean Patent Application No. 10-2019-7027134.
Mar. 26, 2021 Office Action issued in U.S. Appl. No. 16/604,895.
Jan. 26, 2022 Office Action issued in Chinese Patent Application No. 201880060442.1.
Jan. 31, 2017 International Search Report issued in International Patent Application No. PCT/JP2016/082181.
Jun. 30, 2020 Office Action issued in Japanese Patent Application No. 2016-212109.
Mar. 16, 2021 Office Action issued in U.S. Appl. No. 15/771,233.
Anderson, Kevin, ASM Handbook vol. 2A, Aluminum Science and Technology, "Wrought Aluminum Processes and Products", pp. 255-278. (Year: 2018).
Nov. 8, 2021 Office Action issued in U.S. Appl. No. 15/771,233.
Jul. 26, 2022 Office Action Issued in U.S. Appl. No. 15/771,233.
U.S. Appl. No. 15/771,233, filed Apr. 26, 2018 in the name of Amano et al.
Nov. 20, 2020 Office Action issued in U.S. Appl. No. 15/771,233.
Oct. 21, 2022 Office Action Issued in U.S. Appl. No. 16/604,895.
Nov. 22, 2022 Office Action Issued in Japanese Patent Application No. 2019-017602.
Nov. 29, 2022 Office Action Issued in Korean Patent Application No. 10-2022-7023290.
Apr. 5, 2023 Office Action issued in U.S. Appl. No. 16/604,895.
Hirsch, Jurgen, ASM Handbook, vol. 4E, Heat Treating of Nonferrous Alloys, "Annealing of Aluminum and Its Alloys", pp. 137-147, Jun. 2016.
Feb. 10, 2023 Office Action issued in U.S. Appl. No. 15/771,233.
Dec. 22, 2023 Office Action issued in U.S. Appl. No. 15/771,233.
Jun. 28, 2024 Office Action issued in U.S. Appl. No. 15/771,233.
Buchheit, R. G. et al. "Chromate and Chromate-Free Conversion Coatings", ASM Handbook, vol. 13A, pp. 720-735, 2003.
Sep. 25, 2025 Office Action issued in U.S. Appl. No. 15/771,233.
U.S. Appl. No. 16/604,895, filed Oct. 11, 2019 in the name of Yasuda et al.
Dec. 18, 2025 Office Action issued in U.S. Appl. No. 18/230,894.
Guo et al., "Influence of lithium hexafluorophosphate/ethylene carbonate/dimethyl carbonate electrolyte soaking on heat seal strength of polyamide 6/aluminum/cast-polypropylene laminates used as lithium-ion battery packaging", J of Plastic Film & Sheeting, pp1-17, DOI: 10.1177/8756087916686141 (Year: 2016).
Jan. 15, 2026 Office Action issued in U.S. Appl. No. 15/771,233.

* cited by examiner

BATTERY PACKAGING MATERIAL, MANUFACTURING METHOD THEREFOR, BATTERY, AND ALUMINUM ALLOY FOIL

TECHNICAL FIELD

The present invention relates to a battery packaging material, a method for manufacturing the battery packaging material, a battery, and aluminum alloy foil.

BACKGROUND ART

Conventionally, various batteries have been developed, and in all batteries, a packaging material is an indispensable member for sealing in battery elements such as electrodes and electrolytes. Conventionally, metal packaging materials have been frequently used for battery packaging.

Meanwhile, as the performance of electric vehicles, hybrid electric vehicles, personal computers, cameras, mobile phones, and the like has been improved, batteries have been required to have various shapes and be reduced in the thickness and the weight in recent years. However, the metal battery packaging materials that have been frequently used is disadvantageously difficult to fit to various shapes and limited in the weight reduction.

Therefore, as a battery packaging material that can be easily processed into various shapes and can be reduced in the thickness and the weight, a film-shaped laminate has been recently proposed in which a base material/a metal layer/a heat-sealable resin layer are stacked in order (for example, see Patent Document 1).

In such a battery packaging material, generally, a concave portion is formed by cold molding, and a battery element such as an electrode or an electrolytic solution is disposed in a space formed with the concave portion, and heat-sealable resin layers are thermally fused to obtain a battery in which the battery element is housed inside the battery packaging material.

PRIOR ART DOCUMENT

Patent Document

Patent document 1: Japanese Patent Laid-open Publication No. 2008-287971

SUMMARY OF THE INVENTION

Problems to be Solved by the Invention

As batteries have been required to be reduced in the size and the thickness, battery packaging materials have been also required to be further reduced in the thickness in recent years. When the thickness of a battery packaging material is reduced, however, it is difficult to avoid cracks and pinholes during molding.

Under the above-mentioned circumstances, an object of the present invention is mainly to provide a battery packaging material excellent in moldability.

Means for Solving the Problem

The present inventors have conducted intensive studies in order to solve the above-mentioned problems. As a result of the intensive studies, the present inventors have found that a battery packaging material including a laminate including at least a base material layer, an aluminum alloy foil layer, and a heat-sealable resin layer in this order, the battery packaging material in which the aluminum alloy foil layer satisfies a chemical composition according to JIS A8021 and contains 0.08% by mass or less of Si, is particularly excellent in moldability. The present invention has been completed by further studies based on the above-mentioned findings.

That is, the present invention provides the invention of the aspects described below.

Item 1. A battery packaging material including a laminate including at least a base material layer, an aluminum alloy foil layer, and a heat-sealable resin layer in this order, wherein the aluminum alloy foil layer satisfies a chemical composition according to JIS A8021 and contains 0.08% by mass or less of Si.

Item 2. The battery packaging material according to item 1, wherein in 100 arbitrary crystal grains of an aluminum alloy located within a field of view of a scanning electron microscope in a cross section in a thickness direction of the aluminum alloy foil layer, an average crystal grain diameter is 10.0 μm or less, the average crystal grain diameter being an average of maximum diameters x of the 100 arbitrary crystal grains of the aluminum alloy wherein the maximum diameter x is a maximum direct distance between a point on an edge of one crystal grain among the 100 arbitrary crystal grains and a different point on the edge of the crystal grain.

Item 3. The battery packaging material according to item 1 or 2, wherein in 100 arbitrary second phase particles within a field of view of an optical microscope in a cross section in the thickness direction of the aluminum alloy foil layer, an average of diameters y of 20 second phase particles ranked in descending order by the diameter y from first to 20th among the 100 arbitrary second phase particles is 5.0 μm or less wherein the diameter y is a maximum direct distance between a point on an edge of one second phase particle among the 100 arbitrary second phase particles and a different point on the edge of the second phase particle.

Item 4. The battery packaging material according to any one of items 1 to 3, wherein the aluminum alloy foil layer contains 0.05% by mass or less of Cu.

Item 5. The battery packaging material according to any one of items 1 to 4, wherein the base material layer has a lubricant present on a surface of the base material layer.

Item 6. The battery packaging material according to any one of items 1 to 5, wherein the base material layer contains at least one of polyester or polyamide.

Item 7. The battery packaging material according to any one of items 1 to 6, wherein a value determined by dividing a temperature difference $T_2$ by a temperature difference $T_1$ is 0.55 or more wherein the temperature difference $T_1$ and the temperature difference $T_2$ are measured by a method wherein:

(Measurement of Temperature Difference $T_1$)

the temperature difference $T_1$ between an extrapolated melting start temperature and an extrapolated melting end temperature of a melting peak temperature of the heat-sealable resin layer is measured by differential scanning calorimetry; and (Measurement of Temperature Difference $T_2$)

the heat-sealable resin layer is allowed to stand for 72 hours in an electrolytic solution having a concentration of lithium hexafluorophosphate of 1 mol/l and a volume ratio between ethylene carbonate, diethyl carbonate, and dimethyl carbonate of 1:1:1 and is dried in an environment at a temperature of 85° C., and the temperature difference $T_2$ between an extrapolated melting start temperature and an extrapolated melting end temperature of a melting peak temperature of the heat-sealable resin layer after being dried is measured by differential scanning calorimetry.

Item 8. The battery packaging material according to any one of items 1 to 7, comprising an adhesive layer between the aluminum alloy foil layer and the heat-sealable resin layer, wherein the adhesive layer has a logarithmic decrement ΔE of 0.30 or less in rigid pendulum measurement at 120° C.

Item 9. A battery comprising a packaging that includes the battery packaging material according to any one of items 1 to 8, wherein the packaging houses a battery element including at least a positive electrode, a negative electrode, and an electrolyte.

Item 10. An aluminum alloy foil for being used as an aluminum alloy foil layer of a battery packaging material including a laminate including at least a base material layer, the aluminum alloy foil layer, and a heat-sealable resin layer in this order, the aluminum alloy foil satisfying a chemical composition according to JIS A8021 and containing 0.08% by mass or less of Si.

Item 11. A method for manufacturing a battery packaging material, the method comprising a step of stacking at least a base material layer, an aluminum alloy foil layer, and a heat-sealable resin layer in this order to obtain a laminate, wherein the aluminum alloy foil layer satisfies a chemical composition according to JIS A8021 and an aluminum alloy foil containing 0.08% by mass or less of Si is used.

Advantages of the Invention

According to the present invention, the battery packaging material excellent in moldability can be provided. Furthermore, according to the present invention, the method for manufacturing the battery packaging material, the battery in which the battery packaging material is used, and the aluminum alloy foil used in the battery packaging material can be provided.

EMBODIMENTS OF THE INVENTION

The battery packaging material according to the present invention includes a laminate including a base material layer, an aluminum alloy foil layer, and a heat-sealable resin layer in this order, and the aluminum alloy foil layer satisfies a chemical composition according to JIS A8021 and contains 0.08% by mass or less of Si. Hereinafter, the battery packaging material according to the present invention will be described in detail.

In the present description, a numerical range indicated by "to" means "equal to or more than" and "equal to or less than". For example, 2 to 15 mm means 2 mm or more and 15 mm or less.

1. Laminated Structure and Physical Properties of Battery Packaging Material

Figure 1:
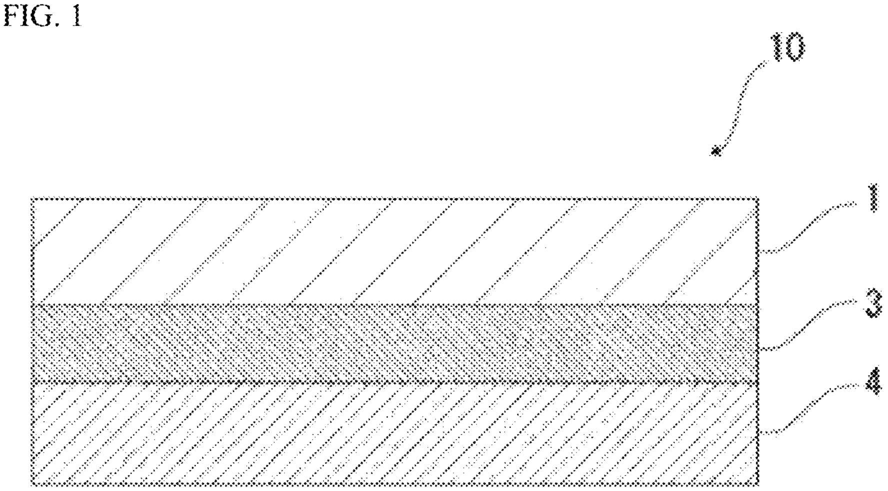
FIG. 1 shows an exemplary schematic view illustrating a cross section structure of the battery packaging material according to the present invention.

As shown in FIG. 1, the battery packaging material 10 according to the present invention includes a laminate including at least a base material layer 1, an aluminum alloy foil layer 3, and a heat-sealable resin layer 4 in this order. In the battery packaging material according to the present invention, the base material layer 1 is on the outermost layer side, and the heat-sealable resin layer 4 is an innermost layer. That is, at the time of assembling the battery, the heat-sealable resin layers 4 located on the periphery of a battery element are heat-sealed to enclose the battery element, so that the battery element is sealed in.

Figure 2:
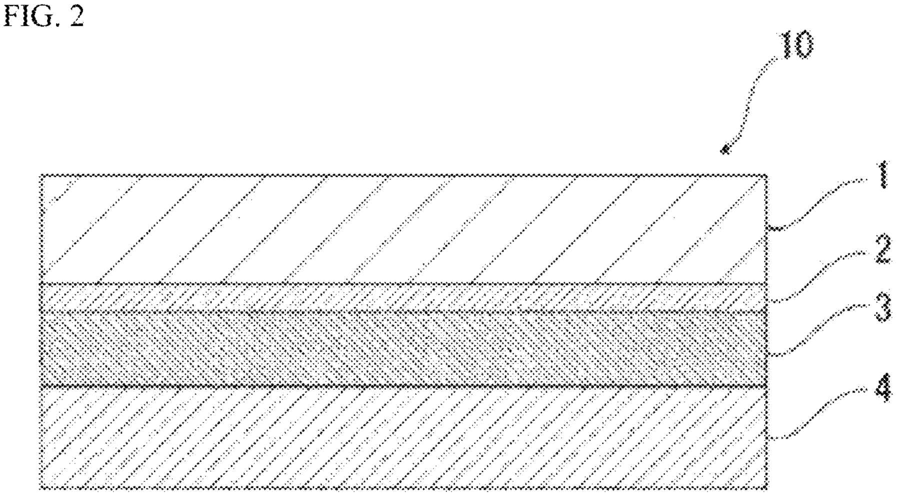
FIG. 2 shows an exemplary schematic view illustrating a cross section structure of the battery packaging material according to the present invention.
Figure 3:
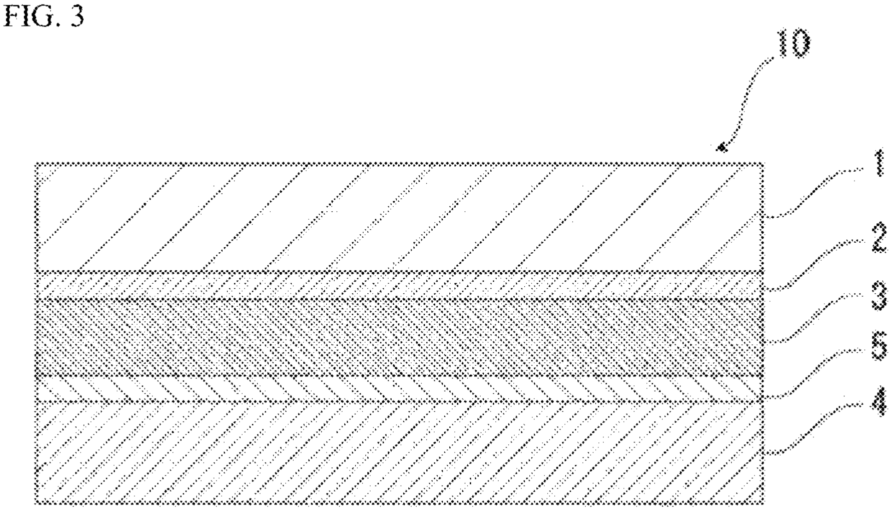
FIG. 3 shows an exemplary schematic view illustrating a cross section structure of the battery packaging material according to the present invention.

As shown in FIG. 2, the battery packaging material 10 according to the present invention may be provided with an adhesive agent layer 2 between the base material layer 1 and the aluminum alloy foil layer 3 if necessary for the purpose of enhancing the bondability between the layers. In addition, as shown in FIG. 3, the battery packaging material 10 according to the present invention may be provided with an adhesive layer 5 between the aluminum alloy foil layer 3 and the heat-sealable resin layer 4 if necessary for the purpose of enhancing the bondability between the layers.

The thickness of the laminate included in the battery packaging material 10 according to the present invention is not particularly limited. From the viewpoint of reducing the thickness of the battery packaging material to increase the energy density of the battery and having the battery packaging material excellent in the moldability, the thickness of the laminate included in the battery packaging material 10 is, for example, about 200 μm or less, preferably about 190 μm or less, more preferably about 60 to 200 μm, and still more preferably about 60 to 190 μm.

Figure 6:
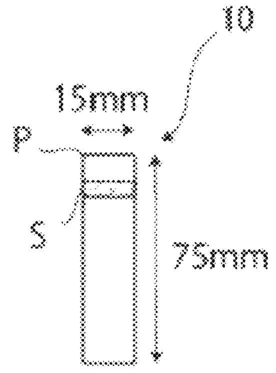
FIG. 6 shows a schematic view illustrating a method for measuring the sealing strength.
Figure 7:
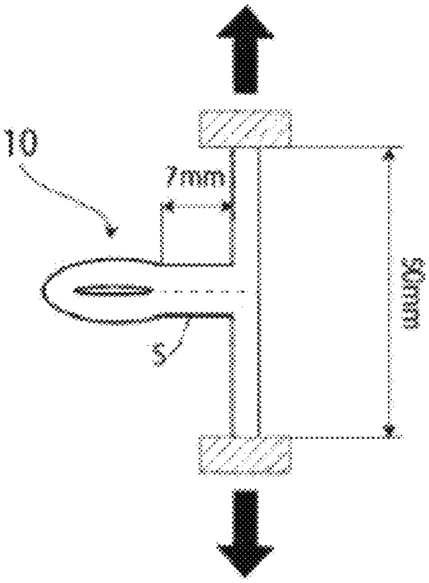
FIG. 7 shows a schematic view illustrating a method for measuring the sealing strength.

In the battery packaging material 10 according to the present invention, the maximum value of the tensile strength (sealing strength) is measured as follows. A test sample in which the heat-sealable resin layers 4 face each other is heated and pressurized from both the sides in the stacking direction under the conditions of a temperature of 190° C., a face pressure of 2.0 MPa, and a time of 3 seconds using a metal plate having a width of 7 mm to heat-seal the heat-sealable resin layers 4 (see FIGS. 5 and 6), then, as shown in FIG. 7, the heat-sealed interface is delaminated by T-shaped peeling in an environment at a temperature of 25° C. under the conditions of a drawing rate of 300 mm/min, a peeling angle of 180°, and a distance between chucks of 50 mm using a tensile tester for 1.5 seconds from the start of the tensile strength measurement to measure the maximum value of the tensile strength (sealing strength). The measured maximum value is preferably 110 N/15 mm or more, and more preferably 120 N/15 mm or more. The upper limit of the tensile strength is, for example, about 200 N/15 mm or less, and the preferable range is, for example, 110 to 200 N/15 mm or 120 to 200 N/15 mm. In order to set such a tensile strength, for example, the type, the composition, the molecular weight, and the like of the resin included in the heat-sealable resin layer are adjusted.

Furthermore, in the battery packaging material 10 according to the present invention, the maximum value of the tensile strength (sealing strength) is measured as follows. A test sample in which the heat-sealable resin layers 4 face each other is heated and pressurized from both the sides in the stacking direction under the conditions of a temperature of 190° C., a face pressure of 2.0 MPa, and a time of 3 seconds using a metal plate having a width of 7 mm to heat-seal the heat-sealable resin layers 4 (see FIGS. 5 and 6), then, as shown in FIG. 7, the heat-sealed interface is delaminated by T-shaped peeling in an environment at a temperature of 140° C. under the conditions of a drawing rate of 300 mm/min, a peeling angle of 180°, and a distance between chucks of 50 mm using a tensile tester for 1.5 seconds from the start of the tensile strength measurement to measure the maximum value of the tensile strength (sealing strength). The measured maximum value is preferably 3.0 N/15 mm or more, and more preferably 4.0 N/15 mm or more. The upper limit of the tensile strength is, for example, about 5.0 N/15 mm or less, and the preferable range is, for example, 3.0 to 5.0 N/15 mm or 4.0 to 5.0 N/15 mm. As described above, since the heat resistance temperature of the separator inside the battery is generally around 120 to 140° C., in the battery packaging material according to the present invention, the maximum value of the tensile strength (sealing strength) in the environment at a high temperature of 140° C. preferably satisfies the above-mentioned value. In order to set such a tensile strength, for example, the type, the composition, the molecular weight, and the like of the resin included in the heat-sealable resin layer are adjusted.

As shown in Examples described below, the tensile test at each temperature is performed in a thermostat, and in the thermostat at a predetermined temperature (25° C. or 140° C.), the test sample is attached to the chuck and held for 2 minutes before starting the measurement.

Furthermore, in an environment at 85° C., the battery packaging material is brought into contact with an electrolytic solution (a solution having a concentration of lithium hexafluorophosphate of 1 mol/l and a volume ratio between ethylene carbonate, diethyl carbonate, and dimethyl carbonate of 1:1:1 (a solution prepared by mixing ethylene carbonate, diethyl carbonate, and dimethyl carbonate at a volume ratio of 1:1:1) for 72 hours, then, with the electrolytic solution adhered to the surface of the heat-sealable resin layer, the heat-sealable resin layers are heat-sealed under the conditions of a temperature of 190° C., a face pressure of 2.0 MPa, and a time of 3 seconds, and the heat-sealed interface is delaminated. In the battery packaging material 10 according to the present invention, the sealing strength at the time of delaminating the heat-sealed interface is preferably 60% or more of the sealing strength obtained in a case where the battery packaging material is not brought into contact with the electrolytic solution (the retention rate of the sealing strength is 60% or more), more preferably 80% or more, and still more preferably 100%.

(Method for Measuring Retention Rate of Sealing Strength)

Using the sealing strength before the contact with the electrolytic solution measured by the following method as a reference (100%), the retention rate (%) of the sealing strength after the contact with the electrolytic solution is calculated.

<Measurement of Sealing Strength Before Contact with Electrolytic Solution>

The tensile strength (sealing strength) is measured in the same manner as in <Measurement of Sealing Strength after Contact with Electrolytic Solution> described below except that the electrolytic solution is not put in the test sample. The sealing strength before the contact with the electrolytic solution is defined as the maximum tensile strength until the heat-sealed portion is completely delaminated.

<Measurement of Sealing Strength after Contact with Electrolytic Solution>

Figure 9:
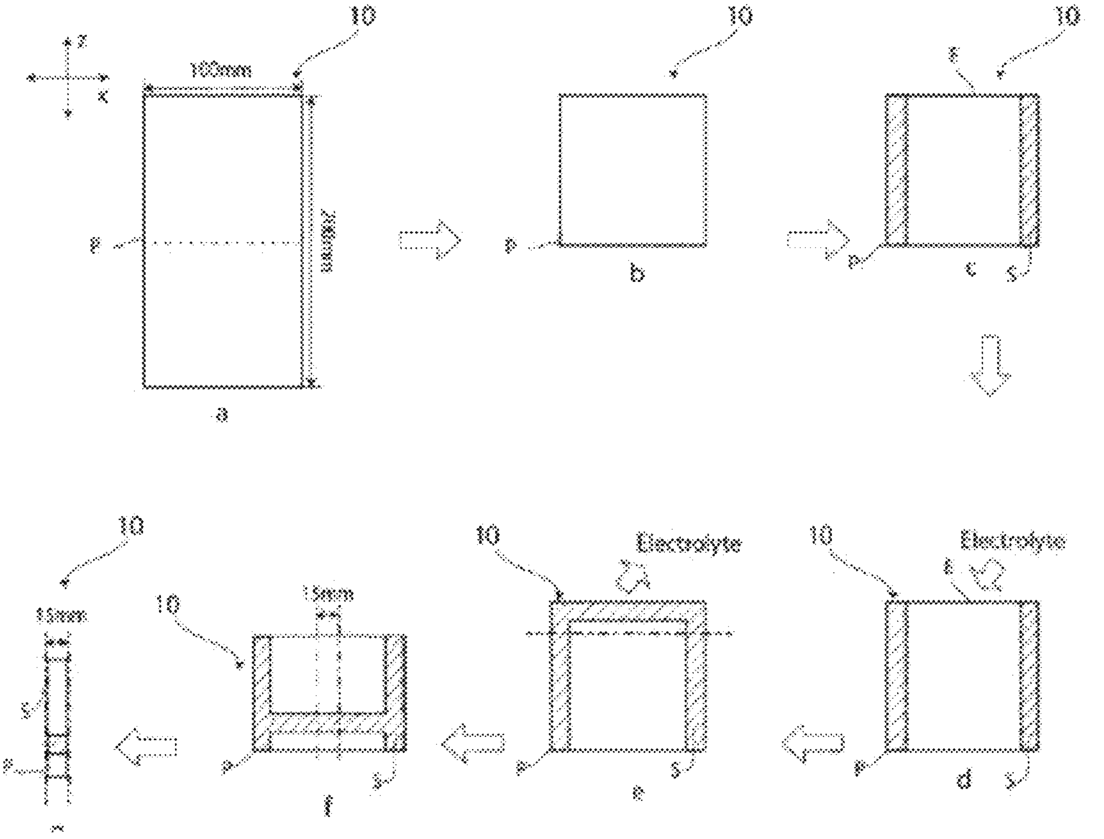
FIG. 9 shows a schematic view illustrating a method for measuring the sealing strength.

As shown in the schematic view of FIG. 9, the battery packaging material is cut into a rectangle having a width (x direction) of 100 mm×a length (z direction) of 200 mm to obtain a test sample (FIG. 9*a*). The test sample is folded back at the center in the z direction so that the heat-sealable resin layer side overlaps (FIG. 9*b*). Next, both the ends in the x direction of the folded test sample are sealed by heat sealing (temperature: 190° C., face pressure: 2.0 MPa, time: 3 seconds) to form the test sample into a bag-shape having an opening E (FIG. 9*c*). Next, from the opening E of the test sample formed into the bag-shape, 6 g of an electrolytic solution (a solution having a concentration of lithium hexafluorophosphate of 1 mol/l and a volume ratio between ethylene carbonate, diethyl carbonate, and dimethyl carbonate of 1:1:1) is put in the bag-shaped test sample (FIG. 9*d*), and the end part of the opening E is sealed by heat sealing (temperature: 190° C., face pressure: 2.0 MPa, time: 3 seconds) (FIG. 9*e*). Next, the bag-shaped test sample is allowed to stand in an environment at a temperature of 85° C. for a predetermined storage time (time for the contact with the electrolytic solution, for example, 72 hours) with the folded portion of the bag-shaped test sample turned down. Next, the end part of the test sample is cut (FIG. 9*e*), and all the electrolytic solution is discharged. Next, with the electrolytic solution adhered to the surface of the heat-sealable resin layer, the upper and the lower surfaces of the test sample are sandwiched between metal plates (7 mm width), and the heat-sealable resin layers are heat-sealed under the conditions of a temperature of 190° C., a face pressure of 1.0 MPa, and a time of 3 seconds (FIG. 9*f*). Next, the test sample is cut into a width of 15 mm with a double-edged sample cutter so that the sealing strength at a width (x direction) of 15 mm can be measured (FIG. 9*f* and FIG. 9*g*). Next, the heat-sealed interface is delaminated by T-shaped peeling in an environment at a temperature of 25° C. under the conditions of a drawing rate of 300 mm/min, a peeling angle of 180°, and a distance between chucks of 50 mm using a tensile tester to measure the tensile strength (sealing strength) (FIG. 7). The sealing strength after the contact with the electrolytic solution is defined as the maximum tensile strength until the heat-sealed portion is completely delaminated.

2. Composition of Each Layer Included in Battery Packaging Material

[Base Material Layer 1]

In the battery packaging material according to the present invention, the base material layer 1 is a layer located on the outermost layer side. The material included in the base material layer 1 is not particularly limited as long as the material has an insulation quality. Examples of the material included in the base material layer 1 include resin films of polyester resins, polyamide resins, epoxy resins, acrylic resins, fluororesins, polyurethane resins, silicone resins, phenol resins, and mixtures or copolymers of the above-mentioned resins. Among the above-mentioned resins, the polyester resins and the polyamide resins are preferable, and the biaxially stretched polyester resins and the biaxially stretched polyamide resins are more preferable. Specific examples of the polyester resins include polyethylene terephthalate, polybutylene terephthalate, polyethylene naphthalate, polybutylene naphthalate, copolymerized polyesters, and polycarbonate. Specific examples of the polyamide resins include nylon 6, nylon 66, copolymers of nylon 6 and nylon 66, nylon 6, 10, and polymethaxylylene adipamide (MXD6).

The base material layer 1 may include a single resin film, but may include two or more resin films in order to improve the pinhole resistance and the insulation quality. Specific examples include multilayer structures in which a polyester film and a nylon film are stacked, multilayer structures in which a plurality of nylon films are stacked, and multilayer structures in which a plurality of polyester films are stacked. When the base material layer 1 has a multilayer structure, laminates of a biaxially stretched nylon film and a biaxially stretched polyester film, laminates of a plurality of biaxially stretched nylon films, and laminates of a plurality of biaxially stretched polyester films are preferable. For example, when the base material layer 1 include two resin films, structures in which a polyester resin and a polyester resin are stacked, structures in which a polyamide resin and a polyamide resin are stacked, and structures in which a polyester resin and a polyamide resin are stacked are preferable, and a structure in which polyethylene terephthalate and polyethylene terephthalate are stacked, a structure in which a nylon and a nylon are stacked, and a structure in which polyethylene terephthalate and a nylon are stacked are more preferable. Furthermore, since the polyester resins are hardly discolored when, for example, the electrolytic solution adheres to the surface, it is preferable to laminate the base material layer 1 so that the polyester resin is located on the outermost layer in the laminated configuration. When the base material layer 1 has a multilayer structure, the thickness of each layer is preferably about 2 to 25 μm.

When the base material layer 1 includes a plurality of resin films, two or more resin films may be stacked via an adhesive component such as an adhesive agent or an adhesive resin, and the type and the amount of the used adhesive component is the same as in the case of the adhesive agent layer 2 described below. The method for stacking two or more resin films is not particularly limited, and known methods can be employed. Examples of the method include a dry lamination method and a sandwich lamination method, and the dry lamination method is preferable. When the resin films are stacked by the dry lamination method, it is preferable to use a urethane-based adhesive agent as the adhesive layer. At this time, the thickness of the adhesive layer is, for example, about 2 to 5 μm.

In the present invention, from the viewpoint of enhancing the moldability of the battery packaging material, the base material layer 1 preferably has a lubricant adhered to its surface. The lubricant is not particularly limited, and amide-based lubricants are preferable. Specific examples of the amide-based lubricants include the same lubricants as exemplified for the heat-sealable resin layer 4 described below.

When the base material layer 1 has a lubricant present on its surface, the amount of the lubricant is not particularly limited, and is preferably about 3 $mg/m^2$ or more, more preferably about 4 to 15 $mg/m^2$, and still more preferably about 5 to 14 $mg/m^2$ in an environment of a temperature of 24° C. and a relative humidity of 60%.

The base material layer 1 may contain the lubricant. The lubricant present on the surface of the base material layer 1 may be obtained by exuding the lubricant contained in the resin included in the base material layer 1 or by applying the lubricant to the surface of the base material layer 1.

The thickness of the base material layer 1 is not particularly limited as long as the function as the base material layer is exhibited, and is, for example, about 3 to 50 preferably about 10 to 45 and more preferably about 10 to 40

[Adhesive Agent Layer 2]

In the battery packaging material 10 according to the present invention, the adhesive agent layer 2 is provided between the base material layer 1 and the aluminum alloy foil layer 3 if necessary in order to firmly adhere the layers to each other.

The adhesive agent layer 2 includes an adhesive agent capable of adhering the base material layer 1 and the aluminum alloy foil layer 3. The adhesive agent used for forming the adhesive agent layer 2 may be a two-part curable adhesive agent or a one-part curable adhesive agent. Furthermore, the bonding mechanism of the adhesive agent used for forming the adhesive agent layer 2 is also not particularly limited, and may be a mechanism by a chemical reaction, solvent volatilization, hot-melt, hot-pressure, or the like.

Specific examples of the adhesive component that can be used for forming the adhesive agent layer 2 include polyester-based resins such as polyethylene terephthalate, polybutylene terephthalate, polyethylene naphthalate, polybutylene naphthalate, polyethylene isophthalate, polycarbonate, and copolymerized polyesters; polyether-based adhesive agents; polyurethane-based adhesive agents; epoxy-based resins; phenolic resins; polyamide-based resins such as nylon 6, nylon 66, nylon 12, and copolymerized polyamides; polyolefin-based resins such as polyolefins, carboxylic acid-modified polyolefins, and metal-modified polyolefins, polyvinyl acetate-based resins; cellulose-based adhesive agents; (meth)acrylic-based resins; polyimide-based resins; amino resins such as a urea resin and a melamine resin; rubbers such as a chloroprene rubber, a nitrile rubber, and a styrene-butadiene rubber; and silicone-based resins. Only one of the adhesive components may be used, or two or more of the adhesive components may be used in combination. Among the adhesive components, the polyurethane-based adhesive agents are preferable.

The thickness of the adhesive agent layer 2 is not particularly limited as long as the function as the adhesive layer is exhibited, and is, for example, about 1 to 10 and preferably about 2 to 5 μm.

[Aluminum Alloy Foil Layer 3]

In the battery packaging material 10, the aluminum alloy foil layer 3 functions as a barrier layer that improves the strength of the battery packaging material and prevents the invasion of water vapor, oxygen, light, and the like into the battery. The aluminum alloy foil layer 3 includes an acid-resistant coating film formed if necessary and an aluminum alloy foil. Furthermore, in the battery packaging material 10 according to the present invention, the aluminum alloy foil layer satisfies the chemical composition according to JIS A8021 and contains 0.08% by mass or less of Si. In the present invention, by using an aluminum alloy foil having such a specific composition, excellent moldability can be provided for the battery packaging material 10.

The chemical composition according to JIS A8021 is based on the JIS standard (JIS H4160: 2006) specifying that the Si content is 0.15% by mass or less, the Fe content is 1.2 to 1.7% by mass or less, the Cu content is 0.05% by mass or less, the content of each element other than Al, Si, and Fc is 0.05% by mass or less, the total content of the elements other than Al, Si, and Fe is 0.15% by mass or less, and the Al content is the balance. Conventionally, the Si content in the aluminum alloy foil that satisfies the chemical composition according to JIS A8021 is usually at least 0.10% by mass or more, and an aluminum alloy foil having the Si content below this value is not substantially used. As an aluminum alloy foil used in a battery packaging material, aluminum alloy foils containing 0.10% by mass or more of Si are used.

On the other hand, in the present invention, the aluminum alloy foil having an Si content of 0.08% by mass or less that is extremely low among the Si contents of the aluminum alloy foils satisfying the chemical composition according to JIS A8021 is used in a battery packaging material. The use makes the moldability of the laminate of different materials, at least, the base material layer, the aluminum alloy foil layer, and the heat-sealable resin layer particularly excellent.

That is, the present invention can also provide the aluminum alloy foil for being used as the aluminum alloy foil layer of the battery packaging material including the laminate including at least the base material layer, the aluminum alloy foil layer, and the heat-sealable resin layer in this order. The aluminum alloy foil according to the present invention satisfies the chemical composition according to JIS A8021 and contains 0.08% by mass or less of Si.

The aluminum alloy foil having an extremely low Si content of 0.08% by mass or less can be prepared by reducing the amount of the Si element added to the aluminum alloy as the raw material during the manufacture of the aluminum alloy foil or by removing the Si component from the raw material when the aluminum alloy as the raw material contains more than 0.08% by mass of the Si element.

The composition of the aluminum alloy foil can be measured by a known method.

From the viewpoint of further improving the moldability of the battery packaging material, the upper limit of the content of Si contained in the aluminum alloy foil layer 3 is preferably about 0.07% by mass or less, and more preferably about 0.06% by mass or less. The lower limit is, for example, about 0.02% by mass or more, preferably about 0.03% by mass or more, and more preferably about 0.05% by mass or more. The preferable range of the content of Si contained in the aluminum alloy foil layer 3 is about 0.02 to 0.08% by mass, about 0.03 to 0.08% by mass, about 0.05 to 0.08% by mass, about 0.02 to 0.07% by mass, about 0.03 to 0.07% by mass, about 0.05 to 0.07% by mass, about 0.02 to 0.06% by mass, about 0.03 to 0.06% by mass, or about 0.05 to 0.06% by mass.

From the viewpoint of further improving the moldability of the battery packaging material, the upper limit of the content of Cu contained in the aluminum alloy foil layer 3 is preferably about 0.05% by mass or less, and more preferably about 0.04% by mass or less. The lower limit is, for example, 0.01% by mass or more, preferably about 0.02% by mass or more, and more preferably about 0.03% by mass or more. The preferable range of the content of Cu contained in the aluminum alloy foil layer 3 is about 0.01 to 0.05% by mass, about 0.01 to 0.04% by mass, about 0.02 to 0.05% by mass, about 0.02 to 0.04% by mass, about 0.03 to 0.05% by mass, or about 0.03 to 0.04% by mass.

From the viewpoint of further improving the moldability of the battery packaging material, the upper limit of the content of Fe contained in the aluminum alloy foil layer 3 is preferably about 1.58% by mass or less, and more preferably about 1.56% by mass or less. The lower limit is preferably about 1.44% by mass or more, and more preferably about 1.46% by mass or more. The preferable range of the content of Fe contained in the aluminum alloy foil layer 3 is about 1.44 to 1.58% by mass, about 1.44 to 1.56% by mass, about 1.46 to 1.58% by mass, or about 1.46 to 1.56% by mass.

From the viewpoint of further enhancing the moldability of the aluminum alloy foil layer 3, the upper limit of the average crystal grain diameter of the aluminum alloy foil layer 3 is preferably about 10.0 μm or less, more preferably 5.0 μm or less, and still more preferably 3.0 μm or less. The lower limit is preferably about 1.0 μm or more, and more preferably about 3.0 μm or more. The preferable range is about 1.0 to 10.0 μm, about 1.0 to 7.0 μm, about 1.0 to 5.0 μm, about 1.0 to 3.0 μm, about 3.0 to 10.0 μm, about 3.0 to 7.0 μm, or about 3.0 to 5.0 μm.

Furthermore, from the viewpoint of further enhancing the moldability of the aluminum alloy foil layer 3, the upper limit of the standard deviation of the average crystal grain diameter of the aluminum alloy foil layer 3 is preferably about 6 μm or less, more preferably 5 μm or less, and still more preferably 4 μm or less. The lower limit is preferably about 1 μm or more, and more preferably about 2 μm or more. The preferable range is about 1 to 6 μm, about 1 to 5 μm, about 1 to 4 μm, about 2 to 6 μm, about 2 to 5 μm, or about 2 to 4 μm. The standard deviation of the average crystal grain diameter of the aluminum alloy foil layer 3 is calculated from the crystal grain diameters of 100 aluminum alloy crystal grains actually measured by the cross-sectional observation described below.

Figure 4:
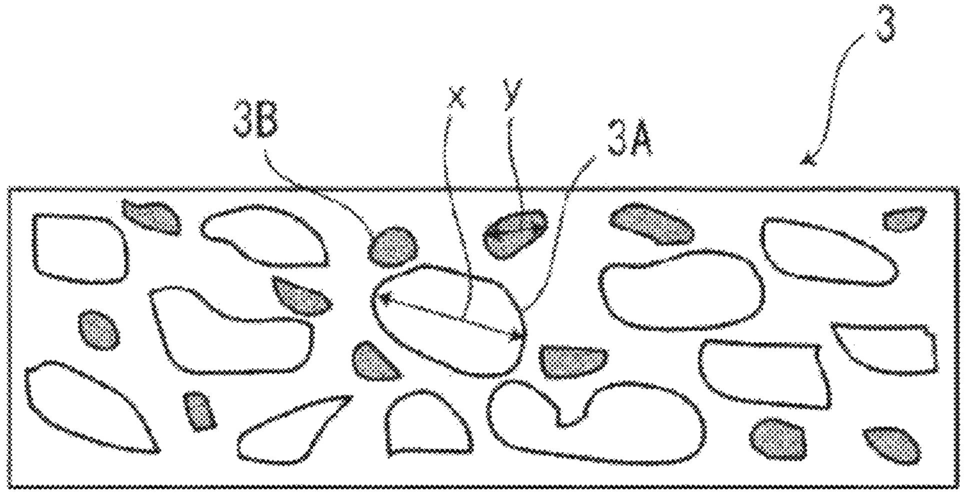
FIG. 4 shows a schematic view illustrating crystal grains and second phase particles in the thickness direction of an aluminum alloy foil layer.

A cross section in the thickness direction of the aluminum alloy foil layer 3 is observed with a scanning electron microscope (SEM), and in 100 aluminum alloy crystal grains 3A located within the field of view, the maximum diameter x is defined as a maximum direct distance between a point on the edge of one crystal grain and a different point on the edge of the crystal grain as shown in the schematic view in FIG. 4. In the present invention, the average crystal grain diameter in the aluminum alloy foil layer means the average of the maximum diameters x of the 100 crystal grains. Note that, in FIG. 4 showing the schematic view, drawing is omitted, and not all the 100 crystal grains 3A are drawn.

Furthermore, in the present invention, in 100 arbitrary second phase particles 3B within a field of view in which the aluminum alloy foil layer 3 is observed with an optical microscope in a cross section in the thickness direction of the laminate included in the battery packaging material, the average of the diameters y of 20 second phase particles ranked in descending order by the diameter y from first to 20th among the 100 arbitrary second phase particles is preferably about 5.0 μm or less, more preferably about 1.0 to 4.0 μm, and still more preferably about 1.0 to 2.0 μm wherein the diameter y is a maximum direct distance between a point on the edge of one second phase particle among the 100 arbitrary second phase particles and a different point on the edge of the second phase particle. When the average crystal grain diameter in the aluminum alloy foil layer 3 is 10.0 μm or less, and the diameter of the second phase particle 3B is in the above-mentioned range, the moldability of the battery packaging material can be further enhanced. Note that, in FIG. 4 showing the schematic view, drawing is omitted, and not all the 100 second phase particles 3B are drawn.

In the present invention, the second phase particle contained in the aluminum alloy foil layer 3 forms an intermetallic compound such as Al—(Fe·Mn)—Si. Such a second phase particle mainly formed during the solidification in a casting process remains without being immobilized in the subsequent step.

In a cross section in the thickness direction of the aluminum alloy foil layer 3 observed with a scanning electron microscope (SEM), the crystal grain usually draws a boundary in contact with a plurality of crystals. In contrast, the second phase particle is usually a crystal having a single boundary. Furthermore, since the crystal grain and the second phase particle have different phases, the colors are different on the SEM image, and the second phase particle often appears white. In addition, when a cross section in the thickness direction of the aluminum alloy foil layer 3 is observed with an optical microscope, the observation is easy because only the second phase particle appears black due to the difference in the phase between the crystal grain and the second phase particle.

Furthermore, from the viewpoint of further enhancing the moldability of the aluminum alloy foil layer 3, in a cross section in the thickness direction of the laminate included in the battery packaging material, the upper limit of the average area of the particle of the aluminum alloy foil layer 3 is preferably about 40 $\mu m^2$ or less, more preferably 30 $\mu m^2$ or less, and still more preferably 25 $\mu m^2$ or less. The lower limit is preferably about 4 $\mu m^2$ or more, and more preferably about 5 $\mu m^2$ or more. The preferable range is about 4 to 40 $\mu m^2$, about 4 to 30 $\mu m^2$, about 4 to 25 $\mu m^2$, about 5 to 40 $\mu m^2$, about 5 to 30 $\mu m^2$, or about 5 to 25 $\mu m^2$. The average area of the particle is measured as described below.

<Measurement of Average Area of Particle>

The cross section of the aluminum alloy foil is observed with a scanning electron microscope (SEM) using an EBSD (an electron backscatter diffraction method, for example, DVC5 manufactured by TSL Solutions) under the conditions of an accelerating voltage of 15 kV, a working distance of 15 mm, an angle of 70 degrees, and a magnification of 2000 times, and the average crystal area of the particle is calculated using the accompanying analysis software.

As batteries have been required to be reduced in the size and the thickness, battery packaging materials have been also required to be further reduced in the thickness in recent years. As a result, aluminum alloy foil layers stacked in the battery packaging materials have been also required to be further reduced in the thickness. In the present invention, even when the thickness of the aluminum alloy foil layer is set at an extremely small value, for example, about 80 μm or less, about 40 μm or less, about 35 μm or less, or about 25 μm or less, the excellent moldability can be exhibited. Furthermore, even when the thickness of the entire battery packaging material is set at an extremely small value, for example, about 200 μm or less, further about 190 μm or less, further about 180 μm or less, further about 150 μm or less, or further about 120 μm or less, the excellent moldability can be exhibited.

In the present invention, from the viewpoint of further reducing the thickness of the battery packaging material to increase the energy density of the battery and to exhibit the excellent moldability, the thickness of the aluminum alloy foil layer 3 is preferably about 20 to 80 μm, more preferably about 20 to 50 μm, and particularly preferably about 20 to 40 μm.

In addition, at least one surface, preferably both surfaces, of the aluminum alloy foil layer 3 is preferably subjected to a chemical conversion treatment for stabilizing the adhesion, preventing the dissolution and the corrosion, and the like. Here, the chemical conversion treatment is a treatment for forming an acid-resistant coating film on the surface of the aluminum alloy foil layer. The examples of the chemical conversion treatment include a chromate treatment using a chromium compound such as chromium nitrate, chromium fluoride, chromium sulfate, chromium acetate, chromium oxalate, chromium biphosphate, chromic acetyl acetate, chromium chloride, or potassium chromium sulfate; a phosphoric acid treatment using a phosphate compound such as sodium phosphate, potassium phosphate, ammonium phosphate, or polyphosphoric acid; and a chromate treatment using an aminated phenol polymer having a repeating unit represented by General Formulae (1) to (4) shown below. In the aminated phenol polymer, only one of the repeating units represented by General Formulae (1) to (4) may be contained, or two or more of the repeating units may be contained in any combination.

[Chem. 1]

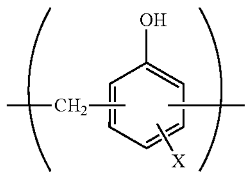

(1)

[Chem. 2]

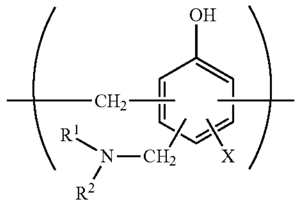

(2)

[Chem. 3]

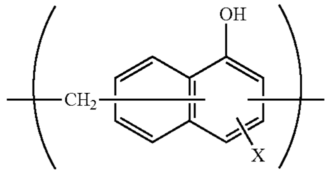

(3)

[Chem. 4]

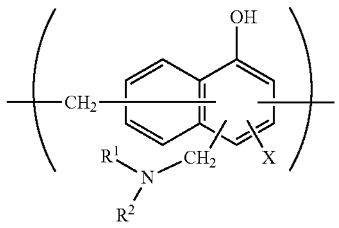

(4)

In General Formulae (1) to (4), X represents a hydrogen atom, a hydroxy group, an alkyl group, a hydroxyalkyl group, an allyl group, or a benzyl group. $R^1$ and $R^2$ are the same or different and each represents a hydroxy group, an alkyl group, or a hydroxyalkyl group. In General Formulae (1) to (4), examples of the alkyl group represented by X, $R^1$, and $R^2$ include a straight-chain or branched-chain alkyl group having 1 to 4 carbon atoms such as a methyl group, an ethyl group, an n-propyl group, an isopropyl group, an n-butyl group, an isobutyl group, or a tert-butyl group.

Examples of the hydroxyalkyl group represented by X, $R^1$, and $R^2$ include a substituted straight-chain or branched-chain alkyl group having 1 to 4 carbon atoms and a hydroxy group such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, or a 4-hydroxybutyl group. In General Formulae (1) to (4), the alkyl groups and the hydroxyalkyl groups each represented by X, $R^1$, or $R^2$ may be the same or different. In General Formulae (1) to (4), X is preferably a hydrogen atom, a hydroxy group, or a hydroxyalkyl group. The number-average molecular weight of the aminated phenol polymer having the repeating units represented by General Formulae (1) to (4) is, for example, preferably about 500 to 1,000,000, and more preferably about 1,000 to 20,000.

Examples of the chemical conversion treatment method for providing corrosion resistance for the aluminum alloy foil layer 3 include a method in which the aluminum alloy foil layer 3 is coated with fine particles such as a metal oxide such as aluminum oxide, titanium oxide, cerium oxide, or tin oxide and barium sulfate dispersed in phosphoric acid, and baked at 150° C. or more to form an acid-resistant coating film on the surface of the aluminum alloy foil layer 3. Furthermore, on the acid-resistant coating film, a resin layer obtained by crosslinking a cationic polymer with a crosslinking agent may be further formed. Here, examples of the cationic polymer include polyethyleneimine, ionic polymer complexes including a polymer having polyethyleneimine and a carboxylic acid, primary amine-grafted acrylic resins obtained by graft-polymerizing a primary amine to an acrylic main skeleton, polyallylamine or derivatives thereof, and aminophenol. Only one of the cationic polymers may be used, or two or more of the cationic polymers may be used in combination. Examples of the crosslinking agent include compounds having at least one functional group selected from the group consisting of an isocyanate group, a glycidyl group, a carboxyl group, and an oxazoline group, and silane coupling agents. Only one of the crosslinking agents may be used, or two or more of the crosslinking agents may be used in combination.

Examples of the specific method for providing the acid-resistant coating film include a method in which, first, at least the inner layer side surface of the aluminum alloy foil is degreased by a well-known treatment method such as an alkali dipping method, an electrolytic cleaning method, an acid cleaning method, an electrolytic acid cleaning method, or an acid activation method, and then, to the degreased surface, a treatment liquid (aqueous solution) mainly containing a metal phosphate such as a chromium phosphate, a titanium phosphate, a zirconium phosphate, or a zinc phosphate and a mixture of the metal phosphates, a treatment liquid (aqueous solution) mainly containing a non-metal phosphate and a mixture of the non-metal phosphates, or a treatment liquid (aqueous solution) containing a mixture of the above-mentioned treatment liquids and an aqueous synthetic resin such as an acrylic-based resin, a phenolic resin, or a urethane-based resin are applied by a well-known coating method such as a roll coating method, a gravure printing method, or a dipping method to form an acid-resistant coating film. For example, when the aluminum alloy foil is treated with the chromium phosphate-based treatment liquid, the acid-resistant coating film contains a chromium phosphate, an aluminum phosphate, an aluminum oxide, an aluminum hydroxide, an aluminum fluoride, and the like, and when the aluminum alloy foil is treated with the zinc phosphate-based treatment liquid, the acid-resistant coating film contains a zinc phosphate hydrate, an aluminum phosphate, an aluminum oxide, an aluminum hydroxide, an aluminum fluoride, and the like.

Examples of the specific method for providing the acid-resistant coating film include another method in which, first, at least the inner layer side surface of the aluminum alloy foil is degreased by a well-known treatment method such as an alkali dipping method, an electrolytic cleaning method, an acid cleaning method, an electrolytic acid cleaning method, or an acid activation method, and then, the degreased surface is subjected to a well-known anodic oxidation treatment to form an acid-resistant coating film.

Examples of the acid-resistant coating film additionally include phosphate-based and chromic acid-based films. Examples of the phosphate include a zinc phosphate, an iron phosphate, a manganese phosphate, a calcium phosphate, and a chromium phosphate, and examples of the chromic acid include a chromium chromate.

Furthermore, examples of the acid-resistant coating film additionally include an acid-resistant coating film of a phosphate, a chromate, a fluoride, or a triazine thiol compound. When such an acid-resistant coating film is formed, dissolution and corrosion of the aluminum surface, in particular, dissolution and corrosion of the aluminum oxide present on the aluminum surface is prevented by preventing the delamination between the aluminum and the base material layer during the embossing and is prevented with hydrogen fluoride generated by a reaction between the electrolyte and the moisture, and the bondability (wettability) of the aluminum surface is improved to show the effect of preventing the delamination between the base material layer and the aluminum during the heat sealing, and the effect of preventing the delamination between the base material layer and the aluminum during the press molding in the case of embossed type. It is suitable that among the substances contained in the acid-resistant coating film, an aqueous solution containing three components of a phenol resin, a chromium (III) fluoride compound, and phosphoric acid is applied to the aluminum surface, and a drying and baking treatment is performed.

The acid-resistant coating film may include a layer having cerium oxide, phosphoric acid or a phosphate, an anionic polymer, and a crosslinking agent for crosslinking the anionic polymer, and in the layer, about 1 to 100 parts by mass of the phosphoric acid or the phosphate may be added based on 100 parts by mass of the cerium oxide. It is preferable that the acid-resistant coating film have a multilayer structure further including a layer having a cationic polymer and a crosslinking agent for crosslinking the cationic polymer.

Furthermore, it is preferable that the anionic polymer be a copolymer mainly containing poly(meth)acrylic acid or a salt thereof, or a copolymer mainly containing (meth)acrylic acid or a salt thereof. Furthermore, it is preferable that the crosslinking agent be at least one selected from the group consisting of a compound having any functional group of an isocyanate group, a glycidyl group, a carboxyl group, and an oxazoline group, and a silane coupling agent.

Furthermore, it is preferable that the phosphoric acid or the phosphate be a condensed phosphoric acid or a condensed phosphate.

Only one of the chemical conversion treatments may be performed, or two or more of the chemical conversion treatments may be performed in combination. Furthermore, the chemical conversion treatments may be performed using only one compound, or may be performed using two or more compounds in combination. Among the chemical conversion treatments, a chromic acid chromate treatment, a chemical conversion treatment combining a chromium compound, a phosphate compound, and an aminated phenol polymer are preferable. Among chromium compounds, chromic acid compounds are preferable.

Specific examples of the acid-resistant coating film include acid-resistant coating films containing at least one of a phosphate, a chromate, a fluoride, and triazinethiol. Acid-resistant coating films containing a cerium compound are also preferable. As the cerium compound, cerium oxide is preferable.

Specific examples of the acid-resistant coating film include phosphate-based coating films, chromate-based coating films, fluoride-based coating films, and triazinethiol compound coating films. The acid-resistant coating film may be one of the above-mentioned coating films, or may be a combination of a plurality of the above-mentioned coating films. Furthermore, the acid-resistant coating film may be formed, after the chemical conversion treatment surface of the aluminum alloy foil is degreased, using a treatment liquid containing a mixture of a metal phosphate and an aqueous synthetic resin or using a treatment liquid containing a mixture of a non-metal phosphate and an aqueous synthetic resin.

The composition of the acid-resistant coating film can be analyzed using, for example, time-of-flight secondary ion mass spectrometry. By analyzing the composition of the acid-resistant coating film using time-of-flight secondary ion mass spectrometry, for example, a peak derived from at least one of $Ce^{+}$ and $Cr^{+}$ is detected.

The surface of the aluminum alloy foil layer 3 is preferably provided with the acid-resistant coating film containing at least one element selected from the group consisting of phosphorus, chromium, and cerium. It can be confirmed, using X-ray photoelectron spectroscopy, that the acid-resistant coating film on the surface of the aluminum alloy foil of the battery packaging material contains at least one element selected from the group consisting of phosphorus, chromium, and cerium. Specifically, first, in the battery packaging material, the heat-sealable resin layer, the adhesive agent layer, and the like that are stacked on the aluminum alloy foil are physically peeled. Next, the aluminum alloy foil is put in an electric furnace, and the organic component present on the surface of the aluminum alloy foil is removed at about 300° C. for about 30 minutes. Then, it is confirmed that the above-mentioned element is contained using X-ray photoelectron spectroscopy on the surface of the aluminum alloy foil.

The amount of the acid-resistant coating film formed on the surface of the aluminum alloy foil layer 3 in the chemical conversion treatment is not particularly limited. For example, when the above-mentioned chromate treatment is performed, it is desirable that about 0.5 to 50 mg, preferably about 1.0 to 40 mg of the chromium compound in terms of chromium, about 0.5 to 50 mg, preferably about 1.0 to 40 mg of the phosphorus compound in terms of phosphorus, and about 1.0 to 200 mg, preferably about 5.0 to 150 mg of the aminated phenol polymer are contained per 1 $m^2$ of the surface of the aluminum alloy foil layer 3.

The thickness of the acid-resistant coating film is not particularly limited. From the viewpoint of the cohesive strength of the coating film and the adhesion to the aluminum alloy foil or the heat-sealable resin layer, the thickness is preferably about 1 nm to 10 μm, more preferably about 1 to 100 μm, and still more preferably about 1 to 50 nm. The thickness of the acid-resistant coating film can be measured by observation with a transmission electron microscope or by a combination of observation with a transmission electron microscope and energy dispersive X-ray spectroscopy or electron beam energy loss spectroscopy.

The chemical conversion treatment is performed by applying a solution containing a compound used for forming the acid-resistant coating film to the surface of the aluminum alloy foil layer by a bar coating method, a roll coating method, a gravure coating method, a dipping method, or the like and then heating the aluminum alloy foil layer to a temperature of about 70 to 200° C. Before the chemical conversion treatment is performed on the aluminum alloy foil layer, the aluminum alloy foil layer may be degreased by an alkali dipping method, an electrolytic cleaning method, an acid cleaning method, an electrolytic acid cleaning method, or the like in advance. By degreasing the aluminum alloy foil layer in this manner, it is possible to more efficiently perform the chemical conversion treatment on the surface of the aluminum alloy foil layer.

[Heat-Sealable Resin Layer 4]

In the battery packaging material according to the present invention, the heat-sealable resin layer 4 corresponds to the innermost layer, and is a layer in which the heat-sealable resin layers are heat-sealed to enclose the battery element at the time of assembling the battery.

The resin component used in the heat-sealable resin layer 4 is not particularly limited as long as the resin component is heat-sealable, and examples of the resin component include polyolefins, cyclic polyolefins, acid-modified polyolefins, and acid-modified cyclic polyolefins. That is, the heat-sealable resin layer 4 may contain a polyolefin skeleton or no polyolefin skeleton, and preferably contains a polyolefin skeleton. It can be analyzed that the heat-sealable resin layer 4 contains a polyolefin skeleton by, for example, infrared spectroscopy, gas chromatography-mass spectrometry, or the like, and the analysis method is not particularly limited. For example, when a maleic anhydride-modified polyolefin is measured by infrared spectroscopy, peaks derived from the maleic anhydride are detected in the vicinity of a wave number of 1760 $cm^{-1}$ and a wave number of 1780 $cm^{-1}$. When the degree of acid modification is low, however, the peak may be too small to be detected. In the case, the analysis can be performed by nuclear magnetic resonance spectroscopy.

Specific example of the polyolefins include polyethylenes such as low-density polyethylenes, medium-density polyethylenes, high-density polyethylenes, and linear low-density polyethylenes; polypropylenes such as block copolymers of a homopolypropylene and a polypropylene, (for example, a block copolymer of propylene and ethylene), random copolymers of a polypropylene (for example, a random copolymer of propylene and ethylene); and a terpolymer of ethylene-butene-propylene. Among the above-mentioned polyolefins, the polyethylenes and the polypropylenes are preferable.

The cyclic polyolefin is a copolymer of an olefin and a cyclic monomer, and examples of the olefin that is a constituent monomer of the cyclic polyolefin include ethylene, propylene, 4-methyl-1-pentene, butadiene, and isoprene. Examples of the cyclic monomer that is a constituent monomer of the cyclic polyolefin include cyclic alkenes such as norbornene; specifically, cyclic dienes such as cyclopentadiene, dicyclopentadiene, cyclohexadiene, and norbornadiene. Among the above-mentioned polyolefins, the cyclic alkenes are preferable, and norbornene is more preferable.

The acid-modified polyolefin is a polymer modified by block polymerization or graft polymerization of the polyolefin with an acid component such as carboxylic acid. Examples of the acid component used for the modification include carboxylic acids such as maleic acid, acrylic acid, itaconic acid, crotonic acid, maleic anhydride, and itaconic anhydride, and anhydrides of the carboxylic acids.

The acid-modified cyclic polyolefin is a polymer produced by substitution of a part of the constituent monomers of a cyclic polyolefin with an α,β-unsaturated carboxylic acid or an anhydride thereof followed by copolymerization, or by block polymerization or graft polymerization of an α,β-unsaturated carboxylic acid or an anhydride thereof to a cyclic polyolefin. The carboxylic acid-modified cyclic polyolefin is the same as described above. The carboxylic acid used for the modification is the same as the acid component used for the modification of the polyolefin.

Among the above-mentioned resin components, the polyolefins such as the polypropylenes and the carboxylic acid-modified polyolefins are preferable; and the polypropylenes and the acid-modified polypropylenes are more preferable.

The heat-sealable resin layer 4 may include only one of the resin components, or may include a blend polymer produced by combining two or more of the resin components. Furthermore, the heat-sealable resin layer 4 may include only one layer, or may include two or more layers of the same or different resin components.

In the present invention, from the viewpoint of enhancing the moldability of the battery packaging material, the heat-sealable resin layer preferably has a lubricant adhered to its surface. The lubricant is not particularly limited, and amide-based lubricants are preferable. Specific examples of the amide-based lubricants include saturated fatty acid amides, unsaturated fatty acid amides, substituted amides, methylolamides, saturated fatty acid bisamides, and unsaturated fatty acid bisamides. Specific examples of the saturated fatty acid amides include lauric acid amide, palmitic acid amide, stearic acid amide, behenic acid amide, and hydroxystearic acid amide. Specific examples of the unsaturated fatty acid amides include oleic acid amide and erucic acid amide. Specific examples of the substituted amides include N-oleyl palmitic acid amide, N-stearyl stearic acid amide, N-stearyl oleic acid amide, N-oleyl stearic acid amide, and N-stearyl erucic acid amide. Specific examples of the methylolamides include methylol stearic acid amide. Specific examples of the saturated fatty acid bisamides include methylene bis stearic acid amide, ethylene bis capric acid amide, ethylene bis lauric acid amide, ethylene bis stearic acid amide, ethylene bis hydroxystearic acid amide, ethylene bis behenic acid amide, hexamethylene bisstearic acid amide, hexamethylene bisbehenic acid amide, hexamethylene hydroxystearic acid amide, N,N'-distearyl adipic acid amide, and N,N'-distearyl sebacic acid amide. Specific examples of the unsaturated fatty acid bisamides include ethylene bis oleic acid amide, ethylene bis erucic acid amide, hexamethylene bis oleic acid amide, N,N'-dioleyl adipic acid amide, and N,N'-dioleyl sebacic acid amide. Specific examples of the fatty acid ester amide include stearoamidoethyl stearate. Specific examples of the aromatic bisamide include m-xylylene bisstearic acid amide, m-xylylene bis hydroxystearic acid amide, and N,N'-distearyl isophthalic acid amide. Only one of the lubricants may be used, or two or more of the lubricants may be used in combination.

When the heat-sealable resin layer 4 has a lubricant present on its surface, the amount of the lubricant is not particularly limited, and is preferably about 3 mg/m$^2$ or more, more preferably about 4 to 15 mg/m$^2$, and still more preferably about 5 to 14 mg/m$^2$ in an environment of a temperature of 24° C. and a relative humidity of 60%.

The heat-sealable resin layer 4 may contain the lubricant. The lubricant present on the surface of the heat-sealable resin layer 4 may be obtained by exuding the lubricant contained in the resin included in the heat-sealable resin layer 4 or by applying the lubricant to the surface of the heat-sealable resin layer 4.

The thickness of the heat-sealable resin layer 4 is not particularly limited as long as the function as the heat-sealable resin layer is exhibited, and is preferably about 60 μm or less, more preferably about 15 to 60 μm, and still more preferably about 15 to 40 μm.

Figure 10:
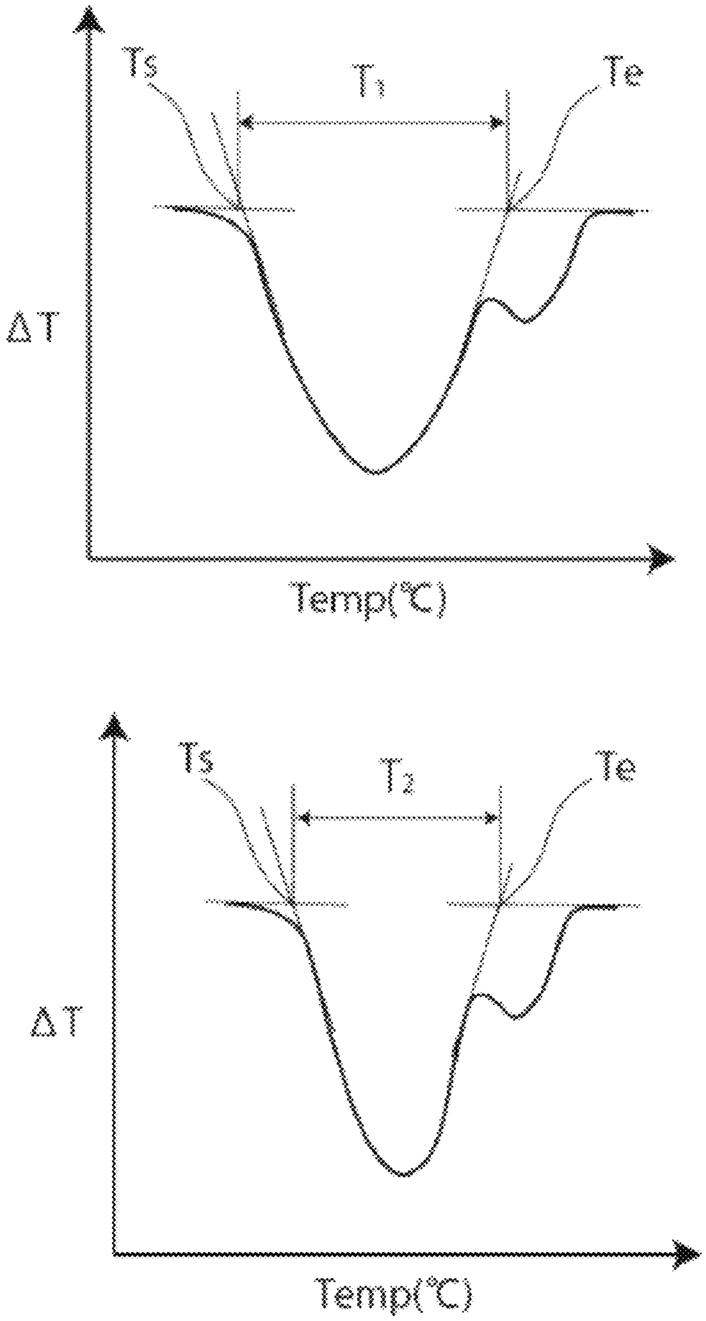
FIG. 10 shows a graphical representation schematically illustrating a temperature difference $T_1$ and a temperature difference $T_2$ in differential scanning calorimetry.

From the viewpoint of exhibiting the further enhanced sealing strength by heat-sealing even when the heat-sealable resin layers are heat-sealed in a state that the electrolytic solution is in contact with and adhered to the heat-sealable resin layers in a high temperature environment, a value determined by dividing a temperature difference $T_2$ by a temperature difference $T_1$ (ratio $T_2/T_1$) is, for example, preferably 0.55 or more, and more preferably 0.60 or more wherein the temperature difference $T_1$ and the temperature difference $T_2$ are measured by a method described below. As understood from the contents of the measurement of the temperature differences $T_1$ and $T_2$ described below, the closer the ratio $T_2/T_1$ is to the upper limit of 1.0, the smaller the change in the width between the start point (extrapolated melting start temperature) and the end point (extrapolated melting end temperature) of the melting peak is before and after the heat-sealable resin layer comes into contact with the electrolytic solution (see the schematic graphical representation shown in FIG. 10). That is, the value of $T_2$ is usually equal to or less than the value of $T_1$. One of the reasons why the change in the width between the extrapolated melting start temperature and the extrapolated melting end temperature of the melting peak increases is that the low molecular weight resin contained in the resin included in the heat-sealable resin layer is eluted into the electrolytic solution by contact with the electrolytic solution, and the width between the extrapolated melting start temperature and the extrapolated melting end temperature of the melting peak of the heat-sealable resin layer decreases after contact with the electrolytic solution compared with before contact with the electrolytic solution. One of the methods for reducing the change in the width between the extrapolated melting start temperature and the extrapolated melting end temperature of the melting peak is a method in which the rate of the low molecular weight resin contained in the resin included in the heat-sealable resin layer is adjusted.

(Measurement of Temperature Difference $T_1$)

In accordance with the specifications of JIS K7121: 2012, a differential scanning calorimetry (DSC) curve is obtained for the polypropylene used in the heat-sealable resin layer of each of the above-mentioned battery packaging materials using DSC. From the obtained DSC curve, the temperature difference $T_1$ between the extrapolated melting start temperature and the extrapolated melting end temperature of the melting peak temperature of the heat-sealable resin layer is measured.

(Measurement of Temperature Difference $T_2$)

The polypropylene used in the heat-sealable resin layer is allowed to stand for 72 hours in an electrolytic solution having a concentration of lithium hexafluorophosphate of 1 mol/l and a volume ratio between ethylene carbonate, diethyl carbonate, and dimethyl carbonate of 1:1:1 in an environment at a temperature of 85° C. and is sufficiently dried. Next, in accordance with the specifications of JIS K7121: 2012, a differential scanning calorimetry (DSC) curve is obtained for the dried polypropylene using DSC. Next, from the obtained DSC curve, the temperature difference $T_2$ between the extrapolated melting start temperature and the extrapolated melting end temperature of the melting peak temperature of the dried heat-sealable resin layer is measured.

In the measurement of the extrapolated melting start temperature and the extrapolated melting end temperature of the melting peak temperature, a commercially available differential scanning calorimeter can be used. As the DSC curve, a DSC curve obtained in the process described below is used. The test sample is held at −50° C. for 10 minutes and then the temperature is raised to 200° C. at a temperature rise rate of 10° C./min (first time), the test sample is held at 200° C. for 10 minutes and then the temperature is lowered to −50° C. at a temperature fall rate of −10° C./min, the test sample is held at −50° C. for 10 minutes and then the temperature is raised to 200° C. at a temperature rise rate of 10° C./min (second time), and the test sample is held at 200° C. for 10 minutes. The DSC curve obtained when the temperature is raised to 200° C. for the second time is used. Furthermore, in the measurement of the temperature differences $T_1$ and $T_2$, among the melting peaks that appear in the range of 120 to 160° C. in each DSC curve, the melting peak with the largest difference in the heat energy input is analyzed. Even when two or more peaks overlap, only the melting peak with the largest difference in the heat energy input is analyzed.

The extrapolated melting start temperature means the start point of the melting peak temperature, and is a temperature at the intersection of the straight line obtained by extending the low-temperature (65 to 75° C.) side baseline to the high-temperature side and the tangent of the curve line of the melting peak with the largest difference in the heat energy input in the low-temperature side at a point where the gradient is maximum. The extrapolated melting end temperature means the end point of the melting peak temperature, and is a temperature at the intersection of the straight line obtained by extending the high-temperature (170° C.) side baseline to the low-temperature side and the tangent of the curve line of the melting peak with the largest difference in the heat energy input in the high-temperature side at a point where the gradient is maximum.

In the battery packaging material according to the present invention, from the viewpoint of exhibiting the further enhanced sealing strength by heat-sealing even when the heat-sealable resin layers are heat-sealed in a state that the electrolytic solution is in contact with and adhered to the heat-sealable resin layers in a high temperature environment, the value determined by dividing the temperature difference $T_2$ by the temperature difference $T_1$ (ratio $T_2/T_1$) is, for example, 0.55 or more, preferably 0.60 or more, more preferably 0.70 or more, and still more preferably 0.75 or more. The preferable range is about 0.55 to 1.0, about 0.60 to 1.0, about 0.70 to 1.0, or about 0.75 to 1.0. The upper limit is, for example, 1.0. In order to set such a ratio $T_2/T_1$, for example, the type, the composition, the molecular weight, and the like of the resin included in the heat-sealable resin layer 4 are adjusted.

In addition, from the viewpoint of exhibiting the further enhanced sealing strength by heat-sealing even when the heat-sealable resin layers are heat-sealed in a state that the electrolytic solution is in contact with and adhered to the heat-sealable resin layers in a high temperature environment, the absolute value of the difference between the temperature difference $T_2$ and the temperature difference $T_1$ $|T_2-T_1|$ is, for example, about 15° C. or less, preferably about 10° C. or less, more preferably about 8° C. or less, still more preferably about 7.5° C. or less. The preferable range is about 0 to 15° C., about 0 to 10° C., about 0 to 8° C., about 0 to 7.5° C., about 1 to 15° C., about 1 to 10° C., about 1 to 8° C., about 1 to 7.5° C., about 2 to 15° C., about 2 to 10° C., about 2 to 8° C., about 2 to 7.5° C., about 5 to 15° C., about 5 to 10° C., about 5 to 8° C., or about 5 to 7.5° C. The lower limit value of the absolute value of the difference $|T_2-T_1|$ is, for example, 0° C., 1° C., 2° C., 5° C., or the like. In order to set the absolute value of the difference $|T_2-T_1|$, for example, the type, the composition, the molecular weight, and the like of the resin included in the heat-sealable resin layer 4 are adjusted.

The temperature difference $T_1$ is preferably about 29 to 38° C., and more preferably about 32 to 36° C. The temperature difference $T_2$ is preferably about 17 to 30° C., and more preferably about 26 to 29° C. In order to set such temperature differences $T_1$ and $T_2$, for example, the type, the composition, the molecular weight, and the like of the resin included in the heat-sealable resin layer 4 are adjusted.

[Adhesive Layer 5]

In the battery packaging material according to the present invention, the adhesive layer 5 is provided between the aluminum alloy foil layer 3 and the heat-sealable resin layer 4 if necessary in order to firmly adhere the layers to each other.

The adhesive layer 5 includes a resin capable of adhering the aluminum alloy foil layer 3 and the heat-sealable resin layer 4. As the resin used for forming the adhesive layer 5, the same adhesive agent as those exemplified for the adhesive agent layer 2 can be used for the bonding mechanism, the type of the adhesive agent component, and the like. In addition, as the resin used for forming the adhesive layer 5, polyolefin-based resins such as the polyolefins, the cyclic polyolefins, the carboxylic acid-modified polyolefins, and the carboxylic acid-modified cyclic polyolefins exemplified for the heat-sealable resin layer 4 described above can also be used. From the viewpoint of the excellent adhesion between the aluminum alloy foil layer 3 and the heat-sealable resin layer 4, the polyolefin is preferably a carboxylic acid-modified polyolefin, and particularly preferably a carboxylic acid-modified polypropylene. That is, the adhesive layer 5 may contain a polyolefin skeleton or no polyolefin skeleton, and preferably contains a polyolefin skeleton. It can be analyzed that the adhesive layer 5 contains a polyolefin skeleton by, for example, infrared spectroscopy, gas chromatography-mass spectrometry, or the like, and the analysis method is not particularly limited. For example, when a maleic anhydride-modified polyolefin is measured by infrared spectroscopy, peaks derived from the maleic anhydride are detected in the vicinity of a wave number of 1760 $cm^{-1}$ and a wave number of 1780 $cm^{-1}$. When the degree of acid modification is low, however, the peak may be too small to be detected. In the case, the analysis can be performed by nuclear magnetic resonance spectroscopy.

Furthermore, from the viewpoint of reducing the thickness of the battery packaging material and having a battery packaging material excellent in shape stability after the molding, the adhesive layer 5 may be a cured product of a resin composition containing an acid-modified polyolefin and a curing agent. Preferable examples of the acid-modified polyolefin include the same carboxylic acid-modified polyolefins and the carboxylic acid-modified cyclic polyolefins as those exemplified for the heat-sealable resin layer 4.

The curing agent is not particularly limited as long as it cures the acid-modified polyolefin. Examples of the curing agent include epoxy-based curing agents, polyfunctional isocyanate-based curing agents, carbodiimide-based curing agents, and oxazoline-based curing agents.

The epoxy-based curing agents are not particularly limited as long as they are a compound having at least one epoxy group. Examples of the epoxy-based curing agents include epoxy resins such as bisphenol A diglycidyl ether, modified bisphenol A diglycidyl ether, novolak glycidyl ether, glycerin polyglycidyl ether, and polyglycerin polyglycidyl ether.

The polyfunctional isocyanate-based curing agents are not particularly limited as long as they are a compound having two or more isocyanate groups. Specific examples of the polyfunctional isocyanate-based curing agents include isophorone diisocyanate (IPDI), hexamethylene diisocyanate (HDI), tolylene diisocyanate (TDI), diphenylmethane diisocyanate (MDI), polymers or nurates of these compounds, and mixtures of the above-mentioned compounds or copolymers of the above-mentioned compounds with another polymer.

The carbodiimide-based curing agents are not particularly limited as long as they are compounds having at least one carbodiimide group (—N═C═N—). As the carbodiimide-based curing agent, a polycarbodiimide compound having at least two or more carbodiimide groups is preferable.

The oxazoline-based curing agents are not particularly limited as long as they have an oxazoline skeleton. Specific examples of the oxazoline-based curing agents include EPOCROS series manufactured by NIPPON SHOKUBAI CO., LTD.

From the viewpoint of enhancing the adhesion between the aluminum alloy foil layer 3 and the heat-sealable resin layer 4 by the adhesive layer 5, or of the like, the curing agent may include two or more compounds.

The resin composition included in the adhesive layer 5 preferably contains the curing agent in the range of about 0.1 to 50% by mass, more preferably in the range of about 0.1 to 30% by mass, and still more preferably in the range of 0.1 to 10% by mass.

The thickness of the adhesive layer 5 is not particularly limited as long as the function as the adhesive layer is exhibited, and is preferably about 1 to 10 μm, and more preferably about 1 to 5 μm when the adhesive agent exemplified for the adhesive agent layer 2 is used. When the resin exemplified for the heat-sealable resin layer 4 is used, the thickness is preferably about 2 to 50 μm, and more preferably about 10 to 40 μm. In the case of the cured product of the acid-modified polyolefin and the curing agent, the thickness is preferably about 30 μm or less, more preferably about 0.1 to 20 μm, and still more preferably about 0.5 to 5 μm. When the adhesive layer 5 is a cured product of a resin composition containing the acid-modified polyolefin and the curing agent, the adhesive layer 5 can be formed by applying the resin composition and curing the resin composition by heating or the like.

In the battery packaging material according to the present invention, the adhesive layer 5 preferably has a logarithmic decrement ΔE of, for example, 0.30 or less, more preferably 0.20 or less in rigid pendulum measurement at 120° C. In the present invention, when the logarithmic decrement ΔE at 120° C. is, for example, 0.30 or less and furthermore 0.20 or less, the crushing of the adhesive layer at the time of heat-sealing the heat-sealable resin layers is effectively suppressed in sealing in the battery element with the battery packaging material, and the high sealing strength is exhibited in a high temperature environment.

The logarithmic decrement in the rigid pendulum measurement at 120° C. is an index indicating the hardness of the resin in the environment at a high temperature of 120° C. The smaller the logarithmic decrement is, the higher the hardness of the resin is. In the rigid pendulum measurement, the decrement of the pendulum is measured when the temperature of the resin is raised from a low temperature to a high temperature. In the rigid pendulum measurement, generally, an edge portion is brought into contact with the surface of the measurement object and the measurement object is subjected to a pendulum movement in the left-right direction to apply a vibration to the measurement object. In the battery packaging material according to the present invention, by placing the hard adhesive layer 5 having a logarithmic decrement of, for example, 0.30 or less and furthermore 0.20 or less in the environment at a high temperature of 120° C. between the aluminum alloy foil layer 3 and the heat-sealable resin layer 4, the crushing (thinning) of the adhesive layer 5 at the time of heat-sealing the battery packaging material is suppressed, and the high sealing strength can be exhibited in the high temperature environment.

The logarithmic decrement ΔE is calculated by the following equation.

$$\Delta E=[\ln(A1/A2)+\ln(A2/A3)+\cdots \ln(An/An+1)]/n$$

A: Amplitude n: Wave number

In the battery packaging material according to the present invention, from the viewpoint of effectively suppressing the crushing of the adhesive layer 5 at the time of heat-sealing the heat-sealable resin layers 4, and furthermore exhibiting the high sealing strength in the high temperature environment, the logarithmic decrement ΔE at 120° C. is, for example, about 0.14 to 0.30, preferably about 0.14 to 0.20, and more preferably about 0.14 to 0.16. In order to set the logarithmic decrement ΔE, for example, the type, the composition, the molecular weight, and the like of the resin included in the adhesive layer 5 are adjusted.

In the measurement of the logarithmic decrement ΔE, a rigid pendulum physical property test is performed on the adhesive layer 5 using a commercially available rigid pendulum type physical property tester under the conditions that the edge portion pressed against the adhesive layer 5 is a cylindrical cylinder edge, the initial amplitude is 0.3 degrees, the temperature range is 30° C. to 200° C., and the temperature rise rate is 3° C./min. Then, based on the logarithmic decrement at 120° C., criteria were determined for the effect of suppressing the crushing of the adhesive layer 5 and for the effect of improving the sealing strength by heat-sealing in the high temperature environment. For the adhesive layer of which the logarithmic decrement ΔE is measured, the battery packaging material is immersed in 15% hydrochloric acid to dissolve the base material layer and the aluminum foil, and the resulting sample including only the adhesive layer and the heat-sealable resin layer is sufficiently dried and used as a measurement object.

Alternatively, the battery packaging material can be taken from the battery to measure the logarithmic decrement ΔE of the adhesive layer 5. When the battery packaging material is taken from the battery to measure the logarithmic decrement ΔE of the adhesive layer 5, a sample is cut out from the top surface portion where the battery packaging material is not stretched by molding, and is used as a measurement object.

Furthermore, in the battery packaging material according to the present invention, the heat-sealable resin layers of the laminate included in the battery packaging material are made to face each other, and heated and pressurized in the stacking direction under the conditions of a temperature of 190° C., a face pressure of 0.5 MPa, and a time of 3 seconds. After the heating and the pressurizing, the residual rate of the thickness of the adhesive layer is preferably 70% or more, or preferably 80% or more. The preferable range is 70 to 95%, or 80 to 95%. The upper limit of the residual rate of the thickness is, for example, about 95%. The residual rate of the thickness is a value measured by the method described below. In order to set the residual rate of the thickness, for example, the type, the composition, the molecular weight, and the like of the resin included in the adhesive layer 5 are adjusted.

<Measurement of Residual Rate of Thickness of Adhesive Layer>

The battery packaging material is cut into a length of 150 mm×a width of 60 mm to prepare a test sample. Next, the heat-sealable resin layers of the test sample are made to face each other. Next, in the above-mentioned state, the test sample is heated and pressurized from both the sides in the stacking direction under the conditions of a temperature of 190° C., a face pressure of 0.5 MPa, and a time of 3 seconds using a metal plate having a width of 7 mm to heat-seal the heat-sealable resin layers. Next, the heat-sealed portion of the test sample is cut in the stacking direction using a microtome, and the thickness of the adhesive layer is measured for the exposed cross section. The test sample before the heat-sealing is also cut in the stacking direction using a microtome, and the thickness of the adhesive layer is measured for the exposed cross section in the same manner as described above. The rate of the thickness of the adhesive layer after the heat-sealing to the thickness of the adhesive layer before the heat-sealing is calculated, and the residual rate (%) of the thickness of the adhesive layer is measured.

Alternatively, the battery packaging material can be taken from the battery to measure the residual rate of the thickness of the adhesive layer 5. When the battery packaging material is taken from the battery to measure the residual rate of the thickness of the adhesive layer 5, a sample is cut out from the top surface portion where the battery packaging material is not stretched by molding, and is used as a measurement object.

The logarithmic decrement ΔE of the adhesive layer 5 can be adjusted by, for example, the melt mass flow rate (MFR), the molecular weight, the melting point, the softening point, the molecular weight distribution, the crystallinity, and the like of the resin included in the adhesive layer 5.

[Surface Coating Layer]

In the battery packaging material according to the present invention, for the purpose of improving the designability, and of the like, the outer side of the base material layer 1 (the opposite side of the base material layer 1 from the aluminum alloy foil layer 3) may be, if necessary, provided with a surface coating layer.

The surface coating layer can include, for example, polyvinylidene chloride, a polyester resin, a urethane resin, an acrylic resin, an epoxy resin, or the like. Among the above-mentioned resins, the surface coating layer preferably includes a two-liquid curable resin. Examples of the two-liquid curable resin included in the surface coating layer include two-liquid curable urethane resins, two-liquid curable polyester resins, and two-liquid curable epoxy resins. Furthermore, an additive may be added to the surface coating layer.

Examples of the additive include fine particles having a particle diameter of about 0.5 nm to 5 μm. The material of the additive is not particularly limited, and examples of the material include metals, metal oxides, inorganic substances, and organic substances. The shape of the additive is also not particularly limited, and examples of the shape include sphere shapes, fiber shapes, plate shapes, irregular shapes, and balloon shapes. Specific examples of the additive include talc, silica, graphite, kaolin, montmorilloid, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon blacks, carbon nanotubes, high melting point nylons, crosslinked acrylics, crosslinked styrene, crosslinked polyethylene, benzoguanamine, gold, aluminum, copper, and nickel. Only one of the additives may be used, or two or more of the additives may be used in combination. Among the additives, silica, barium sulfate, and titanium oxide are preferable from the viewpoint of the dispersion stability and the cost. Furthermore, the additive may be subjected to various surface treatments such as an insulation treatment and a dispersibility enhancing treatment on the surface.

The content of the additive in the surface coating layer is not particularly limited, and is preferably about 0.05 to 1.0% by mass and more preferably about 0.1 to 0.5% by mass.

The method for forming the surface coating layer is not particularly limited, and is, for example, a method in which the two-liquid curable resin forming the surface coating layer is applied to the outer surface of the base material layer 1. In the case of adding the additive, the additive may be added to and mixed with the two-liquid curable resin, and then the mixture may be applied.

The thickness of the surface coating layer is not particularly limited as long as the above-mentioned function as the surface coating layer is exhibited, and is, for example, about 0.5 to 10 μm, and preferably about 1 to 5 μm.

3. Method for Manufacturing Battery Packaging Material

The method for manufacturing the battery packaging material according to the present invention is not particularly limited as long as a laminate in which layers having a predetermined composition are stacked can be obtained, and a method for manufacturing can be employed that includes the step of stacking at least the base material layer 1, the aluminum alloy foil layer 3, and the heat-sealable resin layer 4 in this order to obtain a laminate, wherein the aluminum alloy foil layer satisfies the chemical composition according to JIS A8021 and the aluminum alloy foil containing 0.08% by mass or less of Si is used. That is, the battery packaging material according to the present invention can be manufactured by stacking layers using the aluminum alloy foil described in the section of "2. Composition of Each Layer included in Battery Packaging Material" as the aluminum alloy foil layer 3.

An example of the method for manufacturing the battery packaging material according to the present invention is as follows. First, a laminate (hereinafter, sometimes referred to as "laminate A") is formed in which the base material layer 1, the adhesive agent layer 2 provided if necessary, and the aluminum alloy foil layer 3 are stacked in this order. The laminate A can be formed specifically by a dry lamination method in which an adhesive agent used for forming the adhesive agent layer 2 is applied to the base material layer 1 or to the aluminum alloy foil layer 3 having the surface subjected to a chemical conversion treatment if necessary by an application method such as a gravure coating method and a roll coating method and is dried, then the aluminum alloy foil layer 3 or the base material layer 1 is made into a laminate, and the adhesive agent layer 2 is cured.

Next, the aluminum alloy foil layer 3 of the laminate A is laminated with the heat-sealable resin layer 4. When the aluminum alloy foil layer 3 is directly laminated with the heat-sealable resin layer 4, the resin component included in the heat-sealable resin layer 4 is required to be applied to the aluminum alloy foil layer 3 of the laminate A by a gravure coating method, a roll coating method, or the like. When the adhesive layer 5 is provided between the aluminum alloy foil layer 3 and the heat-sealable resin layer 4, for example, the following methods can be employed. (1) A method in which the adhesive layer 5 and the heat-sealable resin layer 4 are stacked on the aluminum alloy foil layer 3 of the laminate A by co-extrusion (co-extrusion lamination method), (2) a method in which a laminate in which the adhesive layer 5 and the heat-sealable resin layer 4 are stacked is formed separately, and the aluminum alloy foil layer 3 of the laminate A is laminated with the laminate by a thermal lamination method, (3) a method in which the aluminum alloy foil layer 3 of the laminate A is laminated with the adhesive agent for forming the adhesive layer 5 by a method such as an extrusion method or solution coating followed by drying at a high temperature and baking, and the adhesive layer 5 is laminated with the heat-sealable resin layer 4 previously formed into a sheet by a thermal lamination method, (4) a method in which the laminate A and the heat-sealable resin layer 4 are bonded to each other via the adhesive layer 5 while the melted adhesive layer 5 is poured between the aluminum alloy foil layer 3 of the laminate A and the heat-sealable resin layer 4 previously formed into a sheet (sandwich lamination method).

When the surface coating layer is provided, the opposite side surface of the base material layer 1 from the aluminum alloy foil layer 3 is laminated with the surface coating layer. The surface coating layer can be formed, for example, by applying the above-mentioned resin forming the surface coating layer to the surface of the base material layer 1. The order of the step of laminating the surface of the base material layer 1 with the aluminum alloy foil layer 3 and the step of laminating the surface of the base material layer 1 with the surface coating layer is not particularly limited. For example, after the surface coating layer is formed on the surface of the base material layer 1, the aluminum alloy foil layer 3 may be formed on the opposite side surface of the base material layer 1 from the surface coating layer.

As described above, the laminate including the surface coating layer provided if necessary/the base material layer 1/the adhesive agent layer 2 provided if necessary/the aluminum alloy foil layer 3 having the surface subjected to a chemical conversion treatment if necessary/the adhesive layer 5 provided if necessary/the heat-sealable resin layer 4 is formed. In order to strengthen the bondability of the adhesive agent layer 2 and the adhesive layer 5 provided if necessary, a heat treatment by hot roll contact, hot air, near or far infrared, or the like may be further performed. The conditions of such a heat treatment are, for example, 150 to 250° C. for 1 to 5 minutes.

In the battery packaging material according to the present invention, each layer included in the laminate may be subjected to a surface activation treatment such as a corona treatment, a blast treatment, an oxidation treatment, or an ozone treatment if necessary in order to improve or stabilize the film formability, the lamination processing, the suitability for the secondary processing of the final product (pouching, embossing), and the like.

4. Use of Battery Packaging Material

The battery packaging material according to the present invention is used in a packaging for enclosing and housing a battery element such as a positive electrode, a negative electrode, or an electrolyte. That is, a battery can be formed by housing a battery element including at least a positive electrode, a negative electrode, and an electrolyte in the packaging including the battery packaging material according to the present invention.

Specifically, a battery in which the battery packaging material is used is provided by covering a battery element including at least a positive electrode, a negative electrode, and an electrolyte with the battery packaging material according to the present invention in a state that the metal terminal connected to each of the positive electrode and the negative electrode protrude outward so that a flange portion (a region where the heat-sealable resin layers are in contact with each other) can be formed on the periphery of the battery element, and by heat-sealing the heat-sealable resin layers of the flange portion to enclose the battery element. When the packaging including the battery packaging material according to the present invention houses the battery element, the packaging is formed so that the heat-sealable resin portion of the battery packaging material according to the present invention is located inside (on the surface in contact with the battery element).

The battery packaging material according to the present invention may be used in either of a primary battery and a secondary battery, and is preferably used in a secondary battery. The secondary battery to which the battery packaging material according to the present invention is applied is not particularly limited. Examples of the secondary battery include a lithium ion battery, a lithium ion polymer battery, a lead storage battery, a nickel-hydrogen storage battery, a nickel-cadmium storage battery, a nickel-iron storage battery, a nickel-zinc storage battery, a silver oxide-zinc storage battery, a metal-air battery, a polyvalent cation battery, a condenser, and a capacitor. Among the secondary batteries, the lithium ion battery and the lithium ion polymer battery are a suitable secondary battery for the battery packaging material according to the present invention to be applied to.

EXAMPLES

Hereinafter, the present invention will be described in detail with reference to Examples and Comparative Examples. However, the present invention is not limited to Examples.

Examples 1 to 15 and Comparative Examples 1 to 8

<Manufacture of Battery Packaging Material>

The battery packaging material was manufactured so as to have a laminated configuration shown in Tables 1 and 2. First, a base material layer was laminated with an aluminum alloy foil as the aluminum alloy foil layer by a dry lamination method. Specifically, a two-liquid urethane adhesive (a polyol compound and an aromatic isocyanate-based compound) was applied to one surface of an aluminum alloy foil to form an adhesive agent layer (thickness: 3 μm) on the aluminum alloy foil. Then, the adhesive agent layer on the aluminum alloy foil layer and a base material layer were laminated by a dry lamination method and then subjected to an aging treatment to produce a laminate of the base material layer/the adhesive agent layer/the aluminum alloy foil layer. In Tables 1 and 2, PET means polyethylene terephthalate, DL means an adhesive layer formed by a dry lamination method using a two-liquid urethane adhesive (a polyol compound and an aromatic isocyanate-based compound), and ONy means a stretched nylon. When the base material layer has a laminated configuration of PET/DL/ONy, the ONy side is laminated with the aluminum alloy foil layer. Furthermore, both the surfaces of the aluminum alloy foil were subjected to a chemical conversion treatment. The chemical conversion treatment of the aluminum alloy foil was performed by applying a treatment liquid containing a phenol resin, a chromium fluoride compound, and phosphoric acid to both the surfaces of the aluminum alloy foil layer by a roll coating method so that the applied amount of chromium is 10 mg/$m^2$ (dry mass) and by baking.

Next, on the aluminum alloy foil layer of each laminate produced as described above, the resins described in Table 1 (PPa: maleic anhydride-modified polypropylene, PP: polypropylene) as the adhesive layer and as the heat-sealable resin layer were melted and co-extruded to stack the adhesive layer and the heat-sealable resin layer on the aluminum alloy foil layer, so that a battery packaging material was obtained in which the base material layer/the adhesive agent layer/the aluminum alloy foil layer/the adhesive layer/the heat-sealable resin layer are stacked in this order. In Examples 5 and 15, different maleic anhydride-modified polypropylene was used in the adhesive layer, and each maleic anhydride-modified polypropylene had a logarithmic decrement ΔE at 120° C. described in Table 5 (a value measured using a rigid pendulum type physical property tester). Furthermore, the heat-sealable resin layer has a value ($T_2/T_1$) adjusted by adjusting the amount of the low molecular weight component in the polypropylene. The value ($T_2/T_1$) can be obtained by dividing the temperature difference $T_2$ by the temperature difference $T_1$. The temperature differences $T_1$ and $T_2$ are measured by the method described below, and are difference between the start point (extrapolated melting start temperature) and the end point (extrapolated melting end temperature) of the melting peak temperature of the heat-sealable resin layer. To the surface of each base material layer, erucic acid amide was applied as a lubricant so that the amount of the lubricant was 7.0 mg/$m^2$ at a temperature of 24° C. and a humidity of 60° C.

In Examples and Comparative Examples, the aluminum alloy foil having the composition, the average crystal grain diameter, the standard deviation of the average crystal grain diameter, and the average area of the particle shown in Tables 3 and 4 was used. The method for measuring the average crystal grain diameter and the standard deviation of the average crystal grain diameter is as described above.

<Measurement of Average Area of Particle>

The cross section of the aluminum alloy foil was observed with a scanning electron microscope (SEM) using an EBSD (an electron backscatter diffraction method, DVC5 manufactured by TSL Solutions) under the conditions of an accelerating voltage of 15 kV, a working distance of 15 mm, an angle of 70 degrees, and a magnification of 2000 times, and the average crystal area of the particle of the aluminum alloy foil used in Examples and Comparative Examples is calculated using the accompanying analysis software.

<Evaluation of Moldability>

Each battery packaging material produced as described above was cut into a rectangle of 80 mm×120 mm to prepare a sample. Using a molding die having a diameter of 30 mm×50 mm (female die, the surface had a maximum height roughness (nominal value of Rz) specified in Table 2 of comparative surface roughness standard piece in JIS B 0659-1: 2002 Annex 1 (Reference) of 3.2 the corner R was 2.3, and the ridge R was 1) and a corresponding molding die (male die, the surface had a maximum height roughness (nominal value of Rz) specified in Table 2 of comparative surface roughness standard piece in JIS B 0659-1: 2002 Annex 1 (Reference) of 1.6 the corner R was 2, and the ridge R was 1), the 10 samples were subjected to cold molding under a pressing pressure of 0.4 MPa. The forming depth was changed from 0.5 mm by 0.5 mm for each sample. The clearance between the male die and the female die was 0.3 mm. The limit forming depth of the sample after the cold molding was defined as the deepest forming depth at which no pinhole and no crack were caused in the battery packaging material in all of the 10 samples. From the limit forming depth, the moldability of the battery packaging material was evaluated in accordance with the criteria shown below. Since the limit forming depth tends to increase as the thickness of the aluminum alloy foil increases, the criteria for the evaluation of the moldability were set for each thickness of the aluminum alloy foil. The results are shown in Tables 3 and 4.

[Evaluation Criteria 1: When Thickness of Aluminum Alloy Foil is 80 μm]

A1: 17.0 mm or more of limit forming depth
B1: 16.0 mm or 16.5 mm of limit forming depth
C1: 15.0 mm or 15.5 mm of limit forming depth
D1: 14.5 mm or less of limit forming depth

[Evaluation Criteria 2: When Thickness of Aluminum Alloy Foil is 40 μm]

A2: 9.0 mm or more of limit forming depth
B2: 8.0 mm or 8.5 mm of limit forming depth
C2: 7.0 mm or 7.5 mm of limit forming depth
D2: 6.5 mm or less of limit forming depth

[Evaluation Criteria 3: When Thickness of Aluminum Alloy Foil is 35 μm]

A3: 8.0 mm or more of limit forming depth
B3: 7.0 mm or 7.5 mm of limit forming depth
C3: 6.0 mm or 6.5 mm of limit forming depth
D3: 5.5 mm or less of limit forming depth

[Evaluation Criteria 4: When Thickness of Aluminum Alloy Foil is 25 μm]

A4: 6.5 mm or more of limit forming depth
B4: 5.5 mm or 6.0 mm of limit forming depth
C4: 4.5 mm or 5.0 mm of limit forming depth
D4: 4.0 mm or less of limit forming depth

TABLE 1

| | Laminated configuration of battery packaging material | | | | | | | | Total |
|---|---|---|---|---|---|---|---|---|---|
| | Base material layer | | | Adhesive agent layer | Aluminum alloy | Adhesive layer | Heat-sealable resin layer | | thickness of |
| | PET (μm) | DL (μm) | ONy (μm) | DL (μm) | foil layer (μm) | PPa (μm) | PP (μm) | | laminate (μm) |
| Example 1 | — | — | 25 | 3 | 80 | 30 | 30 | | 168 |
| Example 2 | 12 | 3 | 25 | 3 | 80 | 30 | 30 | | 183 |

TABLE 1-continued

| | Laminated configuration of battery packaging material | | | | | | | | Total |
|---|---|---|---|---|---|---|---|---|---|
| | Base material layer | | | Adhesive agent layer | Aluminum alloy | Adhesive layer | Heat-sealable resin layer | thickness of |
| | PET (μm) | DL (μm) | ONy (μm) | DL (μm) | foil layer (μm) | PPa (μm) | PP (μm) | laminate (μm) |
| Example 3 | — | — | 25 | 3 | 40 | 22.5 | 22.5 | 113 |
| Example 4 | 12 | 3 | 25 | 3 | 40 | 22.5 | 22.5 | 128 |
| Example 5 | — | — | 15 | 3 | 35 | 20 | 15 | 88 |
| Example 6 | 12 | 3 | 15 | 3 | 35 | 20 | 15 | 103 |
| Example 7 | — | — | 15 | 3 | 35 | 20 | 15 | 88 |
| Example 8 | 12 | 3 | 15 | 3 | 35 | 20 | 15 | 103 |
| Example 9 | — | — | 15 | 3 | 35 | 20 | 15 | 88 |
| Example 10 | 12 | 3 | 15 | 3 | 35 | 20 | 15 | 103 |
| Example 11 | — | — | 15 | 3 | 35 | 20 | 15 | 88 |
| Example 12 | 12 | 3 | 15 | 3 | 35 | 20 | 15 | 103 |
| Example 13 | — | — | 15 | 3 | 25 | 14 | 10 | 67 |
| Example 14 | 12 | 3 | 15 | 3 | 25 | 14 | 10 | 82 |
| Example 15 | — | — | 15 | 3 | 35 | 20 | 15 | 88 |

TABLE 2

| | Laminated configuration of battery packaging material | | | | | | | Total |
|---|---|---|---|---|---|---|---|---|
| | Base material layer | | | Adhesive agent layer | Aluminum alloy | Adhesive layer | Heat-sealable resin layer | thickness of |
| | PET (μm) | DL (μm) | ONy (μm) | DL (μm) | foil layer (μm) | PPa (μm) | PP (μm) | laminate (μm) |
| Comparative Example 1 | — | — | 25 | 3 | 80 | 30 | 30 | 168 |
| Comparative Example 2 | 12 | 3 | 25 | 3 | 80 | 30 | 30 | 183 |
| Comparative Example 3 | — | — | 25 | 3 | 40 | 22.5 | 22.5 | 113 |
| Comparative Example 4 | 12 | 3 | 25 | 3 | 40 | 22.5 | 22.5 | 128 |
| Comparative Example 5 | — | — | 15 | 3 | 35 | 20 | 15 | 88 |
| Comparative Example 6 | 12 | 3 | 15 | 3 | 35 | 20 | 15 | 103 |
| Comparative Example 7 | — | — | 15 | 3 | 35 | 20 | 15 | 88 |
| Comparative Example 8 | 12 | 3 | 15 | 3 | 35 | 20 | 15 | 103 |
| Comparative Example 9 | — | — | 15 | 3 | 35 | 20 | 15 | 88 |
| Comparative Example 10 | 12 | 3 | 15 | 3 | 35 | 20 | 15 | 103 |
| Comparative Example 11 | — | — | 15 | 3 | 25 | 14 | 10 | 67 |
| Comparative Example 12 | 12 | 3 | 15 | 3 | 25 | 14 | 10 | 82 |

TABLE 3

| | Aluminum alloy foil | | | | | | Average crystal grain diameter (μm) | Standard deviation of average crystal grain diameter (μm) | Average area of particle in cross section of aluminum alloy foil ($\mu m^2$) | Total thickness of laminate (μm) | Evaluation of moldability |
|---|---|---|---|---|---|---|---|---|---|---|---|
| | | Composition (% by mass) | | | | | | | | | |
| | Thickness (μm) | Si | Fe | Cu | Total of the other components | Al | | | | | |
| Example 1 | 80 | 0.05 | 1.46 | 0.03 | 0.13 | Balance | 4 | 5 | 23 | 168 | A1 |
| Example 2 | 80 | 0.05 | 1.46 | 0.03 | 0.13 | | 4 | 5 | 23 | 183 | A2 |

TABLE 3-continued

| | Aluminum alloy foil | | | | | | Average crystal grain diameter (μm) | Standard deviation of average crystal grain diameter (μm) | Average area of particle in cross section of aluminum alloy foil ($μm^2$) | Total thickness of laminate (μm) | Evaluation of moldability |
|---|---|---|---|---|---|---|---|---|---|---|---|
| | | Composition (% by mass) | | | | | | | | | |
| | Thickness (μm) | Si | Fe | Cu | Total of the other components | Al | | | | | |
| Example 3 | 40 | 0.05 | 1.46 | 0.03 | 0.13 | | 4 | 5 | 23 | 113 | A2 |
| Example 4 | 40 | 0.05 | 1.46 | 0.03 | 0.13 | | 4 | 5 | 23 | 128 | A2 |
| Example 5 | 35 | 0.05 | 1.46 | 0.03 | 0.13 | | 4 | 5 | 23 | 88 | A3 |
| Example 6 | 35 | 0.05 | 1.46 | 0.03 | 0.13 | | 4 | 5 | 23 | 103 | A3 |
| Example 7 | 35 | 0.08 | 1.48 | 0.02 | 0.12 | | 5 | 6 | 31 | 88 | C3 |
| Example 8 | 35 | 0.08 | 1.48 | 0.02 | 0.12 | | 5 | 6 | 31 | 103 | C3 |
| Example 9 | 35 | 0.07 | 1.56 | 0.03 | 0.13 | | 5 | 6 | 31 | 88 | B3 |
| Example 10 | 35 | 0.07 | 1.56 | 0.03 | 0.13 | | 5 | 6 | 31 | 103 | B3 |
| Example 11 | 35 | 0.03 | 1.49 | 0.02 | 0.13 | | 3 | 3 | 7 | 88 | B3 |
| Example 12 | 35 | 0.03 | 1.49 | 0.02 | 0.13 | | 3 | 3 | 7 | 103 | B3 |
| Example 13 | 25 | 0.05 | 1.46 | 0.03 | 0.13 | | 4 | 5 | 23 | 67 | A4 |
| Example 14 | 25 | 0.05 | 1.46 | 0.03 | 0.13 | | 4 | 5 | 23 | 82 | A4 |
| Example 15 | 35 | 0.05 | 1.46 | 0.03 | 0.13 | | 4 | 5 | 23 | 88 | A3 |

TABLE 4

| | Aluminum alloy foil | | | | | | Average crystal grain diameter (μm) | Standard deviation of average crystal grain diameter (μm) | Average area of particle in cross section of aluminum alloy foil (μm2) | Total thickness of laminate (μm) | Evaluation of moldability |
|---|---|---|---|---|---|---|---|---|---|---|---|
| | | Composition (% by mass) | | | | | | | | | |
| | Thickness (μm) | Si | Fe | Cu | Total of the other components | Al | | | | | |
| Comparative Example 1 | 80 | 0.09 | 1.52 | 0.03 | 0.11 | Balance | 7 | 7 | 41 | 168 | D1 |
| Comparative Example 2 | 80 | 0.09 | 1.52 | 0.03 | 0.11 | | 7 | 7 | 41 | 183 | D1 |
| Comparative Example 3 | 40 | 0.09 | 1.52 | 0.03 | 0.11 | | 7 | 7 | 41 | 113 | D2 |
| Comparative Example 4 | 40 | 0.09 | 1.52 | 0.03 | 0.11 | | 7 | 7 | 41 | 128 | D2 |
| Comparative Example 5 | 35 | 0.09 | 1.52 | 0.03 | 0.11 | | 7 | 7 | 41 | 88 | D3 |
| Comparative Example 6 | 35 | 0.09 | 1.52 | 0.03 | 0.11 | | 7 | 7 | 41 | 103 | D3 |
| Comparative Example 7 | 35 | 0.10 | 1.50 | 0.03 | 0.12 | | 8 | 9 | 56 | 88 | D3 |
| Comparative Example 8 | 35 | 0.10 | 1.50 | 0.03 | 0.12 | | 8 | 9 | 56 | 103 | D3 |
| Comparative Example 9 | 35 | 0.11 | 1.55 | 0.02 | 0.12 | | 11 | 10 | 70 | 88 | D3 |
| Comparative Example 10 | 35 | 0.11 | 1.55 | 0.02 | 0.12 | | 11 | 10 | 70 | 103 | D3 |
| Comparative Example 11 | 25 | 0.09 | 1.52 | 0.03 | 0.11 | | 7 | 7 | 41 | 72 | D4 |
| Comparative Example 12 | 25 | 0.09 | 1.52 | 0.03 | 0.11 | | 7 | 7 | 41 | 87 | D4 |

In Examples 1 to 15 and Comparative Examples 1 to 12, each of the other components (components different from Si, Fe, Cu, and Al) was 0.05% by mass or less.

As is clear from the results shown in Tables 3 and 4, it is found that the battery packaging materials in Examples 1 to 15 in which the aluminum alloy foil included in the aluminum alloy foil layer satisfies the chemical composition according to JIS A8021 and contains 0.08% by mass or less of Si are more excellent in moldability than those in Comparative Examples 1 to 8 in which the aluminum alloy foil contains more than 0.08% by mass of Si.

<Measurement of Logarithmic Decrement ΔE of Adhesive Layer>

Figure 8:
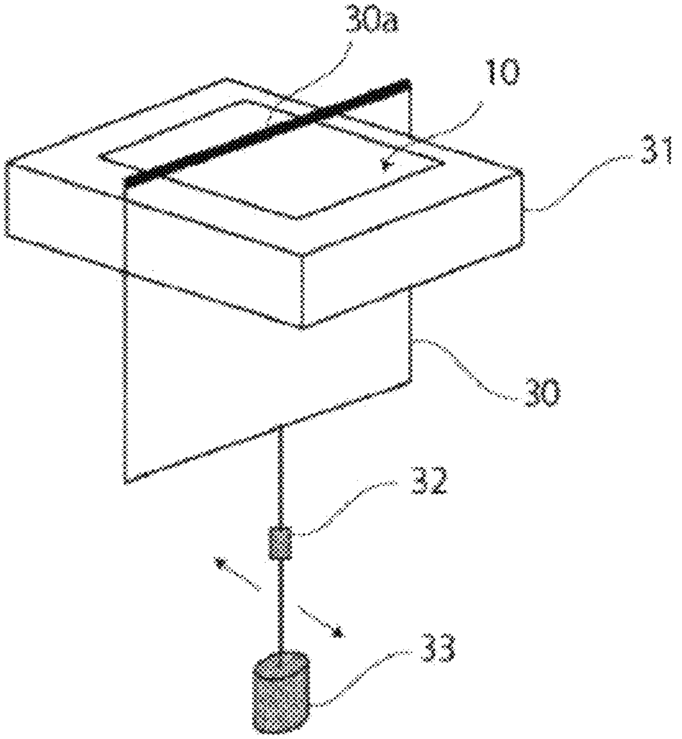
FIG. 8 shows a schematic view illustrating a method for measuring the logarithmic decrement ΔE by rigid pendulum measurement.

Each of the battery packaging materials in Examples 5 and 15 obtained as described above was cut into a rectangle having a width (TD: Transverse Direction) of 15 mm×a length (MD: Machine Direction) of 150 mm to prepare a test sample (battery packaging material 10). The MD of the battery packaging material corresponds to the rolling direction (RD) of the aluminum alloy foil, the TD of the battery packaging material corresponds to the TD of the aluminum alloy foil, and the rolling direction (RD) of the aluminum alloy foil can be recognized from the rolling line. When the MD of the battery packaging material cannot be determined from the rolling line of the aluminum alloy foil, the MD can be determined by the following method. In the method for confirming the MD of the battery packaging material, the cross section of the heat-sealable resin layer of the battery packaging material is observed with an electron microscope to check the sea-island structure, and the direction parallel to the cross section having the largest average diameter of the island shape in the direction perpendicular to the thickness direction of the heat-sealable resin layer can be determined as the MD. Specifically, the cross-section in the length direction of the heat-sealable resin layer and the cross sections in the direction changed by 10 degrees from the direction parallel to the cross-section in the length direction to the direction perpendicular to the cross-section in the length direction for each cross section (10 cross-sections in total) are observed with an electron micrograph to confirm the sea-island structure. Next, in each cross section, each island shape is observed. In each island shape, the diameter y is defined as a direct distance connecting the leftmost end in the direction perpendicular to the thickness direction of the heat-sealable resin layer and the rightmost end in the direction. In each cross section, the average of the 20 diameters y ranked in descending order by the diameter y of the island shape from first to 20th is calculated. The direction parallel to the cross section having the largest average of the diameter y of the island shape is determined as the MD. A schematic view illustrating a method for measuring the logarithmic decrement ΔE by rigid pendulum measurement is shown in FIG. 8. A rigid pendulum type physical property tester (model number: RPT-3000W manufactured by A&D Company, Limited) was used, FRB-100 was used as the frame of a pendulum 30, RBP-060 was used as a cylindrical cylinder edge 30*a* at the edge portion, CHB-100 was used as a cooling/heating block 31, a vibration displacement detector 32 and a weight 33 were used, and the initial amplitude was set at 0.3 degrees. The test sample was placed on the cooling/heating block 31 with the measurement surface (adhesive layer) of the test sample upward, and the cylindrical cylinder edge 30*a* with the pendulum 30 was placed on the measurement surface so that the axial direction of the cylindrical cylinder edge 30*a* was orthogonal to the MD direction of the test sample. Furthermore, in order to prevent the test sample from being lifted or warped during the measurement, the test sample was fixed on the cooling/heating block 31 with a tape stuck on the portion where the tape had no effect on the measurement result of the test sample. The cylindrical cylinder edge was brought into contact with the surface of the adhesive layer. Next, the logarithmic decrement ΔE of the adhesive layer was measured using the cooling/heating block 31 at a temperature rise rate of 3° C./min in a temperature range of 30° C. to 200° C. The logarithmic decrement ΔE was adopted when the surface temperature of the adhesive layer of the test sample (battery packaging material 10) was 120° C. (The test sample measured once was not used, and the average of three values (N=3) each measured using a newly cut test sample was used.) For the adhesive layer, each of the battery packaging materials in Examples 5 and 15 obtained as described above was immersed in 15% hydrochloric acid to dissolve the base material layer and the aluminum foil, and the resulting test sample including only the adhesive layer and the heat-sealable resin layer was sufficiently dried to measure the logarithmic decrement ΔE. Each logarithmic decrement ΔE at 120° C. is shown in Table 5. (The logarithmic decrement ΔE is calculated by the following equation.

$$\Delta E=[\ln(A1/A2)+\ln(A2/A3)+\ldots+\ln(An/An+1)]/n$$

A: Amplitude n: Wave number

<Measurement of Residual Rate of Thickness of Adhesive Layer>

Each of the battery packaging materials in Examples 5 and 15 obtained as described above was cut into a length of 150 mm×a width of 60 mm to prepare a test sample (battery packaging material 10). Next, the heat-sealable resin layers of the test samples having the same size prepared from the same battery packaging material were made to face each other. Next, in the above-mentioned state, the test sample was heated and pressurized from both the sides in the stacking direction under the conditions of a temperature of 190° C., the face pressure shown in Table 5 (0.5 MPa), and a time of 3 seconds using a metal plate having a width of 7 mm to heat-seal the heat-sealable resin layers. Next, the heat-sealed portion of the test sample was cut in the stacking direction using a microtome, and the thickness of the adhesive layer was measured for the exposed cross section. The test sample before the heat-sealing was also cut in the stacking direction using a microtome, and the thickness of the adhesive layer was measured for the exposed cross section in the same manner as described above. The rate of the thickness of the adhesive layer after the heat-sealing to the thickness of the adhesive layer before the heat-sealing was calculated, and the residual rate (%) of the thickness of the adhesive layer was measured for each test sample. The results are shown in Table 5.

<Measurement of Sealing Strength in 25° C. Environment or 140° C. Environment>

Figure 5:
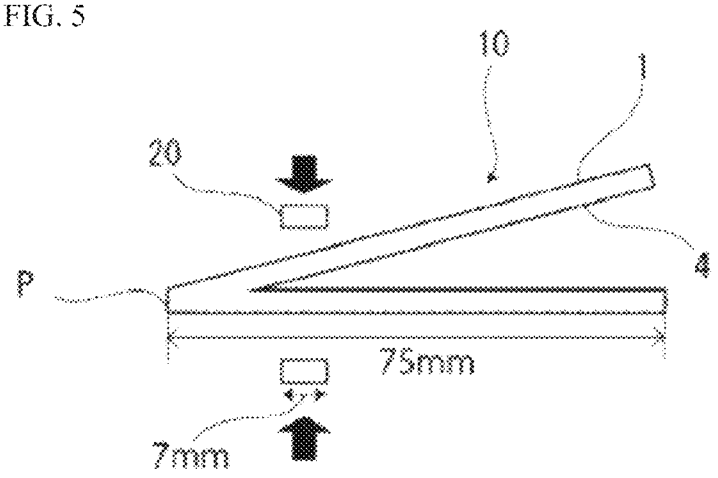
FIG. 5 shows a schematic view illustrating a method for measuring the sealing strength.

Each of the battery packaging materials in Examples 5 and 15 obtained as described above was cut into a rectangle having a width of 60 mm×a length of 150 mm to prepare a test sample (battery packaging material 10). Next, as shown in FIG. 5, the test sample was folded back at the center P in the length direction, and the heat-sealable resin layers were made to face each other. Next, the heat-sealable resin layers were heat-sealed using a metal plate 20 having a width of 7 mm under the conditions of a face pressure of 1.0 MPa, a time of 1 second, and 190° C. in 7 mm in the length direction of the test sample (the width of the metal plate) and in the entire width direction (that is, 60 mm). Next, as shown in FIG. 6, the test sample was cut into a width of 15 mm using a double-edged sample cutter. In FIG. 6, the heat-sealed region is indicated by S. Next, as shown in FIG. 7, the heat-sealed interface was delaminated by T-shaped peeling in an environment at a temperature of 25° C. or 140° C. under the conditions of a drawing rate of 300 mm/min, a peeling angle of 180°, and a distance between chucks of 50 mm using a tensile tester. The sealing strength in a 25° C. environment and the sealing strength in a 140° C. environment were each defined as the maximum value of the peeling strength (N/15 mm) for 1.5 seconds from the start of the measurement of the tensile strength. The tensile test at each temperature was performed in a thermostat, and in the thermostat at a predetermined temperature, the test sample was attached to the chuck and held for 2 minutes before starting the measurement. Each sealing strength is an average of three values (n=3) measured by preparing three test samples in the same manner. The results are shown in Table 5.

TABLE 5

| | Logarithmic decrement | Residual rate of thickness of | Sealing strength (N/15 mm) | |
|---|---|---|---|---|
| | ΔE of adhesive layer at 120° C. | adhesive layer (%) Face pressure 0.5 MPa | 25° C. environment | 140° C. environment |
| Example 5 | 0.15 | 82 | 125 | 4.2 |
| Example 15 | 0.26 | 73 | 130 | 3.2 |

From the results shown in Table 5, it is found that in the battery packaging materials in Examples 5 and 15, the adhesive layer located between the aluminum alloy foil layer and the heat-sealable resin layer has a logarithmic decrement ΔE of 0.30 or less in the rigid pendulum measurement at 120° C., the crushing of the adhesive layer at the time of heat-sealing the heat-sealable resin layers is effectively suppressed, and the high sealing strength is exhibited in the high temperature environment. Furthermore, it is found that in the battery packaging material in Example 5, the logarithmic decrement ΔE is 0.20 or less, the crushing of the adhesive layer at the time of heat-sealing the heat-sealable resin layers is more effectively suppressed, and the higher sealing strength is exhibited in the high temperature environment.

<Measurement of Extrapolated Melting Start Temperature and Extrapolated Melting End Temperature of Melting Peak Temperature>

For the polypropylene used in the heat-sealable resin layer of each of the battery packaging materials in Examples 5 and 15 described above, the extrapolated melting start temperature and the extrapolated melting end temperature of the melting peak temperature were measured by the method shown below. Then, the temperature differences $T_1$ and $T_2$ between the extrapolated melting start temperature and the extrapolated melting end temperature were measured, and from the value of the obtained temperature differences $T_1$ and $T_2$, the ratio ($T_2/T_1$) and the absolute value of the difference $|T_2-T_1|$ were calculated. The results are shown in Table 6.

(Measurement of Temperature Difference $T_1$)

In accordance with the specifications of JIS K7121: 2012, a DSC curve was obtained for the polypropylene used in the heat-sealable resin layer of each of the battery packaging materials in Examples 5 and 15 described above using differential scanning calorimetry (DSC). From the obtained DSC curve, the temperature difference $T_1$ between the extrapolated melting start temperature and the extrapolated melting end temperature of the melting peak temperature of the heat-sealable resin layer was measured.

(Measurement of Temperature Difference $T_2$)

The polypropylene used in the heat-sealable resin layer was allowed to stand for 72 hours in an electrolytic solution having a concentration of lithium hexafluorophosphate of 1 mol/l and a volume ratio between ethylene carbonate, diethyl carbonate, and dimethyl carbonate of 1:1:1 in an environment at a temperature of 85° C. and was sufficiently dried. Next, in accordance with the specifications of JIS K7121: 2012, a DSC curve was obtained for the dried polypropylene using differential scanning calorimetry (DSC). Next, from the obtained DSC curve, the temperature difference $T_2$ between the extrapolated melting start temperature and the extrapolated melting end temperature of the melting peak temperature of the dried heat-sealable resin layer was measured.

In the measurement of the extrapolated melting start temperature and the extrapolated melting end temperature of the melting peak temperature, Q200 manufactured by TA Instruments was used as a differential scanning calorimeter. As the DSC curve, a DSC curve obtained in the process described below was used. The test sample was held at −50° C. for 10 minutes and then the temperature was raised to 200° C. at a temperature rise rate of 10° C./min (first time), the test sample was held at 200° C. for 10 minutes and then the temperature was lowered to −50° C. at a temperature fall rate of −10° C. min, the test sample was held at −50° C. for 10 minutes and then the temperature was raised to 200° C. at a temperature rise rate of 10° C./min (second time), and the test sample was held at 200° C. for 10 minutes. The DSC curve obtained when the temperature was raised to 200° C. for the second time was used. Furthermore, in the measurement of the temperature differences $T_1$ and $T_2$, among the melting peaks that appeared in the range of 120 to 160° C. in each DSC curve, the melting peak with the largest difference in the heat energy input was analyzed. Even when two or more peaks overlapped, only the melting peak with the largest difference in the heat energy input was analyzed.

The extrapolated melting start temperature means the start point of the melting peak temperature, and was a temperature at the intersection of the straight line obtained by extending the low-temperature (65 to 75° C.) side baseline to the high-temperature side and the tangent of the curve line of the melting peak with the largest difference in the heat energy input in the low-temperature side at a point where the gradient was maximum. The extrapolated melting end temperature means the end point of the melting peak temperature, and was a temperature at the intersection of the straight line obtained by extending the high-temperature (170° C.) side baseline to the low-temperature side and the tangent of the curve line of the melting peak with the largest difference in the heat energy input in the high-temperature side at a point where the gradient was maximum.

<Measurement of Sealing Strength before Contact with Electrolytic Solution>

The tensile strength (sealing strength) was measured in the same manner as in <Measurement of Sealing Strength after Contact with Electrolytic Solution> described below except that the electrolytic solution was not put in the test sample. The sealing strength before the contact with the electrolytic solution is defined as the maximum tensile strength until the heat-sealed portion is completely delaminated. In Table 7, the sealing strength before the contact with the electrolytic solution is described as the sealing strength when the contact time of the electrolytic solution is 0 h at 85° C.

<Measurement of Sealing Strength after Contact with Electrolytic Solution>

As shown in the schematic view of FIG. 9, each of the battery packaging materials in Examples 5 and 15 obtained as described above was cut into a rectangle having a width (x direction) of 100 mm×a length (z direction) of 200 mm to obtain a test sample (battery packaging material 10) (FIG. 9*a*). The test sample (battery packaging material 10) was folded back at the center in the z direction so that the heat-sealable resin layer side overlapped (FIG. 9*b*). Next, both the ends in the x direction of the folded test sample were sealed by heat sealing (temperature: 190° C., face pressure: 2.0 MPa, time: 3 seconds) to form the test sample into a bag-shape having an opening E (FIG. 9*c*). Next, from the opening E of the test sample formed into the bag-shape, 6 g of an electrolytic solution (a solution having a concentration of lithium hexafluorophosphate of 1 mol/l and a volume ratio between ethylene carbonate, diethyl carbonate, and dimethyl carbonate of 1:1:1) was put in the bag-shaped test sample (FIG. 9*d*), and the end part of the opening E was sealed by heat sealing (temperature: 190° C., face pressure: 2.0 MPa, time: 3 seconds) (FIG. 9*e*). Next, the bag-shaped test sample was allowed to stand in an environment at a temperature of 85° C. for a predetermined storage time (a time for the contact with the electrolytic solution of 0 hours, 24 hours, or 72 hours) with the folded portion of the bag-shaped test sample turned down. Next, the end part of the test sample was cut (FIG. 9*e*), and all the electrolytic solution was discharged. Next, with the electrolytic solution adhered to the surface of the heat-sealable resin layer, the upper and the lower surfaces of the test sample were sandwiched between metal plates 20 (7 mm width), and the heat-sealable resin layers were heat-sealed under the conditions of a temperature of 190° C., a face pressure of 1.0 MPa, and a time of 3 seconds (FIG. 9*f*). Next, the test sample was cut into a width of 15 mm with a double-edged sample cutter so that the measurement of the sealing strength at a width (x direction) of 15 mm was possible (FIG. 9*f* and FIG. 9*g*). Next, the heat-sealed interface was delaminated by T-shaped peeling in an environment at a temperature of 25° C. under the conditions of a drawing rate of 300 mm/min, a peeling angle of 180°, and a distance between chucks of 50 mm using a tensile tester (AGS-xplus (trade name) manufactured by SHIMADZU CORPORATION) to measure the tensile strength (sealing strength) (FIG. 7). The sealing strength after the contact with the electrolytic solution was defined as the maximum tensile strength until the heat-sealed portion was completely delaminated (the distance until the heat-sealed portion was delaminated was the width of the metal plate, 7 mm).

Using the sealing strength before the contact with the electrolytic solution as a reference (100%), the retention rate (%) of the sealing strength after the contact with the electrolyte solution is shown in Table 7.

TABLE 6

| | Melting peak temperature | | | | | |
|---|---|---|---|---|---|---|
| | Contact with electrolytic solution at 85° C. | Start point (° C.) | End point (° C.) | Temperature difference between start point and end point (° C.) | Ratio $T_2/T_1$ | Absolute value of difference $\lvert T_2 - T_1 \rvert$ |
| Example 5 | Before | 126.3 | 161.0 | $T_1 = 34.7$ | 0.79 | 7.2 |
| | After | 128.1 | 155.6 | $T_2 = 27.5$ | | |
| Example 15 | Before | 126.9 | 157.5 | $T_1 = 30.6$ | 0.59 | 12.6 |
| | After | 131.4 | 149.4 | $T_2 = 18.0$ | | |

TABLE 7

| | | Contact time with electrolytic solution at 85° C. | | |
|---|---|---|---|---|
| | | 0 h | 24 h | 72 h |
| Example 5 | Sealing strength (N/15 mm) | 140 | 140 | 140 |
| | Retention rate (%) | 100 | 100 | 100 |
| Example 15 | Sealing strength (N/15 mm) | 132 | 107 | 82 |
| | Retention rate (%) | 100 | 81 | 62 |

From the results shown in Table 6, it is found that the battery packaging materials in Examples 5 and 15 have a value obtained by dividing the temperature difference $T_2$ by the temperature difference $T_1$ of 0.55 or more, and exhibit the high sealing strength by heat-sealing even when the heat-sealable resin layers are heat-sealed in the state that the electrolytic solution is in contact with and adhered to the heat-sealable resin layers in the high temperature environment. Furthermore, it is found that the battery packaging material in Example 5 has a value obtained by dividing the temperature difference $T_2$ by the temperature difference $T_1$ of 0.60 or more, and exhibits the higher sealing strength by heat-sealing even when the heat-sealable resin layers are heat-sealed in the state that the electrolytic solution is in contact with and adhered to the heat-sealable resin layers in the high temperature environment.

DESCRIPTION OF REFERENCE SIGNS

1: Base material layer
2: Adhesive agent layer
3: Aluminum alloy foil layer
4: Heat-sealable resin layer
5: Adhesive layer

The invention claimed is:

1. A battery packaging material comprising a laminate including at least a base material layer, an aluminum alloy foil layer, an adhesive layer, and a heat-sealable resin layer in this order, wherein:

the battery packaging material has a sealing strength at 25° C. of 110 to 200 N/15 mm, the laminate further comprises a lubricant that is:

present on a surface of the heat-sealable resin layer in an amount of about 3 to 15 mg/m$^2$ in an environment of a temperature of 24° C. and a relative humidity of 60%, and contained in the heat-sealable resin layer, a total thickness of the laminate is 60 to 190 μm, the adhesive layer has a logarithmic decrement ΔE of 0.30 or less in rigid pendulum measurement at 120° C., the aluminum alloy foil layer has a chemical composition comprising:

Si: 0.02 to 0.03% by mass,

Fe: 1.2 to 1.7% by mass,

Cu: 0.05% by mass or less, each element other than Al, Si, and Fe: 0.05% by mass or less, a total content of elements other than Al, Si, and Fe being 0.15% by mass or less, and Al: balance, an average area of second phase particles in a cross section of the aluminum alloy foil is 5 to 25 μm$^2$, in 100 arbitrary second phase particles within a field of view of an optical microscope in a cross section in the thickness direction of the aluminum alloy foil layer, an average of diameters y of 20 second phase particles ranked in descending order by the diameter y from first to 20th among the 100 arbitrary second phase particles is 5.0 μm or less wherein the diameter y is a maximum direct distance between a point on an edge of one second phase particle among the 100 arbitrary second phase particles and a different point on the edge of the second phase particle, and in 100 arbitrary crystal grains of the aluminum alloy foil layer located within a field of view of a scanning electron microscope in a cross section in a thickness direction of the aluminum alloy foil layer:

an average crystal grain diameter is 4.0 μm or more and 10.0 μm or less, the average crystal grain diameter being an average of maximum diameters x of the 100 arbitrary crystal grains of the aluminum alloy foil layer wherein the maximum diameter x is a maximum direct distance between a point on an edge of one crystal grain among the 100 arbitrary crystal grains and a different point on the edge of the crystal grain, and a standard deviation of the average crystal grain diameter is 5.0 μm or less.

2. The battery packaging material according to claim 1, wherein the lubricant is further present on a surface of the base material layer.

3. The battery packaging material according to claim 1, wherein the base material layer contains at least one of polyester or polyamide.

4. The battery packaging material according to claim 1, wherein a value determined by dividing a temperature difference $T_2$ by a temperature difference $T_1$ is 0.55 or more wherein the temperature difference Ti and the temperature difference $T_2$ are measured by a method wherein:

(Measurement of Temperature Difference $T_1$)

the temperature difference $T_1$ between an extrapolated melting start temperature and an extrapolated melting end temperature of a melting peak temperature of the heat-sealable resin layer is measured by differential scanning calorimetry; and (Measurement of Temperature Difference $T_2$)

the heat-sealable resin layer is allowed to stand for 72 hours in an electrolytic solution having a concentration of lithium hexafluorophosphate of 1 mol/l and a volume ratio between ethylene carbonate, diethyl carbonate, and dimethyl carbonate of 1:1:1 and is dried in an environment at a temperature of 85° C., and the temperature difference $T_2$ between an extrapolated melting start temperature and an extrapolated melting end temperature of a melting peak temperature of the heat-sealable resin layer after being dried is measured by differential scanning calorimetry.

5. A battery comprising a packaging that includes the battery packaging material according to claim 1, wherein the packaging houses a battery element including at least a positive electrode, a negative electrode, and an electrolyte.

6. A method for manufacturing the battery packaging material according to claim 1, the method comprising a step of stacking at least the base material layer, the aluminum alloy foil layer, the adhesive layer, and the heat-sealable resin layer in this order to obtain the laminate of claim 1.

7. The battery packaging material according to claim 1, wherein the logarithmic decrement ΔE of the adhesive layer is 0.20 or less.

* * * * *